United States Patent [19]
Watanabe

[11] Patent Number: 6,164,839
[45] Date of Patent: Dec. 26, 2000

[54] CAMERA WITH CHANGING UNIT

[75] Inventor: Hajime Watanabe, Tokyo, Japan

[73] Assignee: Canon Kabushiki Kaisha, Tokyo, Japan

[21] Appl. No.: 09/188,691

[22] Filed: Nov. 10, 1998

[30] Foreign Application Priority Data

Nov. 13, 1997 [JP] Japan ................................. 9-327237

[51] Int. Cl.⁷ ........................................ G03B 17/18
[52] U.S. Cl. .................... 395/292; 396/297; 396/319; 396/429
[58] Field of Search .................... 396/310, 311, 396/315, 319, 321, 429, 281, 287, 291, 292, 297, 299; 348/232

[56] References Cited

U.S. PATENT DOCUMENTS 5,506,644  4/1996  Suzuki et al. ........................ 396/319
5,666,186  9/1997  Meyerhoefer et al. ................ 396/281

FOREIGN PATENT DOCUMENTS 5-224290  9/1993  Japan .
6-130486  5/1994  Japan .

Primary Examiner—David M. Gray
Attorney, Agent, or Firm—Fitzpatrick, Cella, Harper & Scinto

[57] ABSTRACT

A camera including a selection unit for selecting data, a recording unit for recording the data selected by the selection unit onto an image recording medium, and a changing unit for changing, in accordance with information relating to an image being photographed and position information, a selection manner and selection order by which the selection unit selects the data.

31 Claims, 19 Drawing Sheets

FIG. 2A    FIG. 2B

| ADDRESS | CODE | CAPTION | |
|---|---|---|---|
| 00h | 0100h | CONGRATULATIONS! | |
| 01h | 0101h | I'M HAPPY | AUTO |
| 02h | 0102h | : | |
| 03h | 0103h | : | |
| 04h | 0200h | CUTE | |
| : | : | : | CLOSEUP |
| : | : | : | |
| : | : | : | |
| 08h | 0300h | LOVELY | |
| : | : | SMART | PORTRAIT |
| : | : | : | |
| : | : | : | |
| 0Ch | 0401h | SPORTS MEETING | |
| : | : | HOLD OUT! | SPORTS |
| : | : | : | |
| : | : | : | |
| 10h | 0501h | NIGHT VIEW OF A MILLION DOLLARS | |
| : | : | FIREWORKS | NIGHT VIEW |
| : | : | : | |
| : | : | : | |
| 14h | 0601h | FINE SCENERY | |
| : | : | : | SCENERY |
| : | : | : | |
| 17h | 0603h | : | |

| FIG. 5A | FIG. 5B |

| FIG. 8A | FIG. 8B |

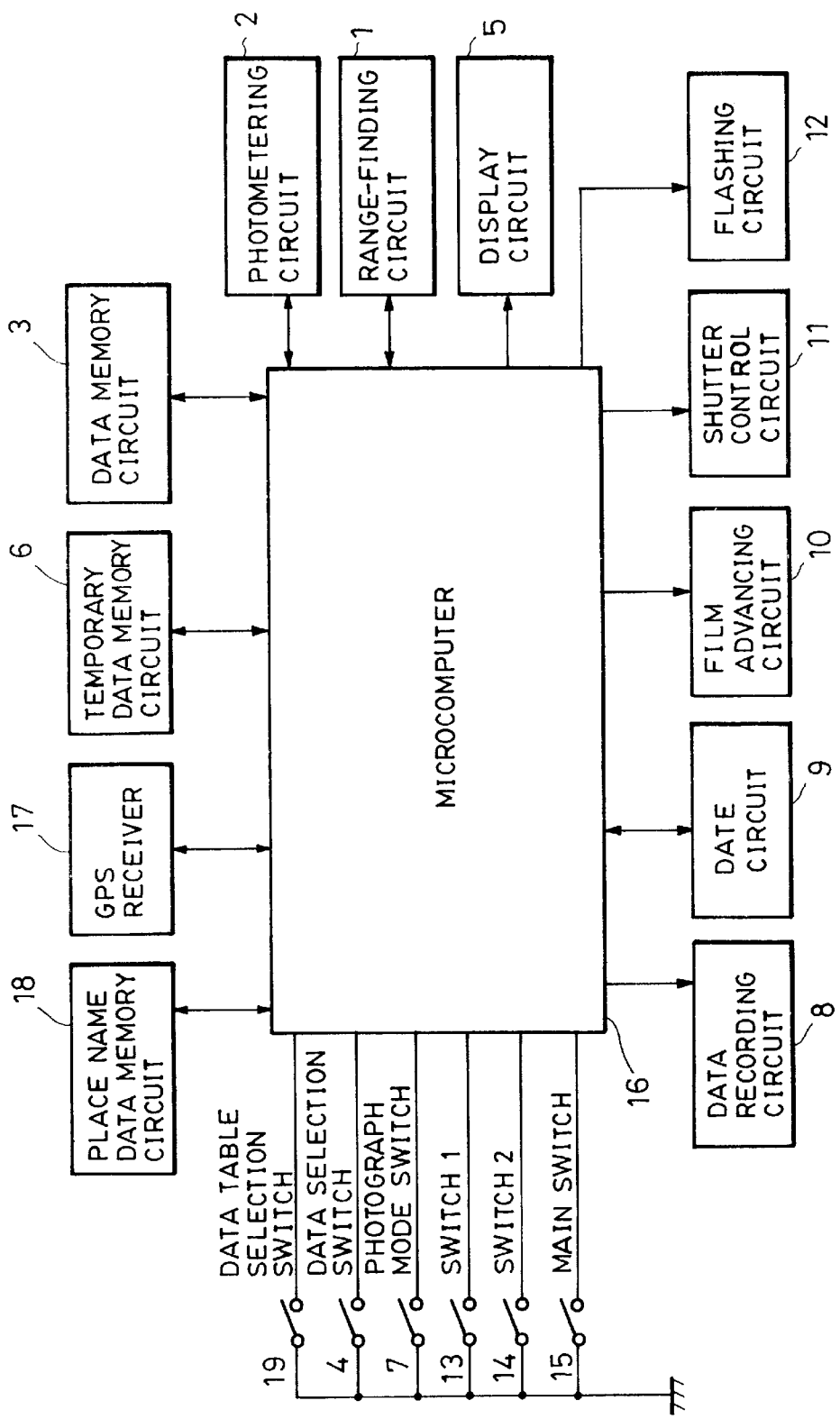

FIG. IIA

| ADDRESS | CODE |
|---|---|
| 00h | 0004h |
| 01h | 001Ch |
| 02h | 0028h |
| 03h | 0040h |
| 04h | 0100h |
| : | 0101h |
| : | : |
| 1Bh | 0117h |
| 1Ch | 1000h |
| 1Dh | 1001h |
| : | : |
| 27h | 100Bh |
| 28h | 2000h |
| 29h | 2001h |
| : | : |
| 03Fh | 2017h |
| 040h | |
| 041h | |
| : | |

- 0004h ... 0101h: PHOTOGRAPH MODE
- 1Ch ... : PLACE NAME
- 28h ... : DATE

DATA MEMORY CIRCUIT

FIG. IIB

| ADDRESS | CODE |
|---|---|
| 00h | 0400h |
| 01h | 0401h |
| 02h | 0402h |
| 03h | 0403h |
| 04h | 0500h |
| : | : |
| 08h | 0600h |
| : | : |
| 0Ch | 0101h |
| : | : |
| 10h | 0201h |
| : | : |
| 14h | 0301h |
| : | : |
| 17h | 0303h |

TEMPORARY DATA MEMORY CIRCUIT

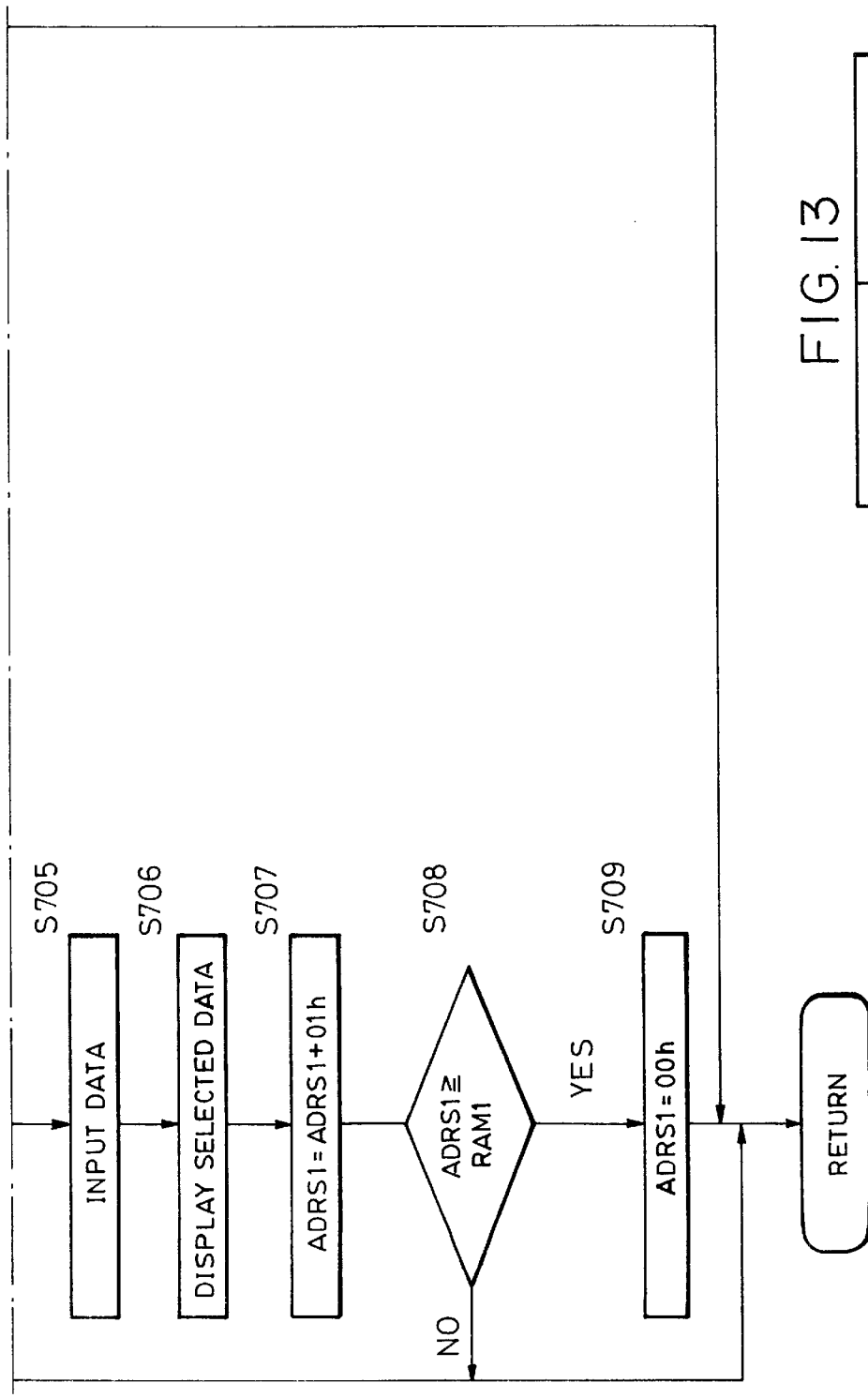

CAMERA WITH CHANGING UNIT

BACKGROUND OF THE INVENTION

1. Field of the Invention

The present invention relates to improvements in a device of a camera and the like for photographing or magnetically recording data, such as a message, onto a film.

2. Description of the Related Art

Some known cameras are provided with a data photographing device that imprints photographic data such as the date and time of photographing and exposure conditions onto an image recording medium such as a film. Some data photographing devices are a data back which is an accessory having photographing means built in a member corresponding to a rear cover of a camera, and other data photographing devices, built in the body of a camera, are a dating mechanism for photographic data.

In some devices, a memory is used to store characters, pictographic symbols, and other information representing photographing environments, including photographing typical message such as "A Happy New Year!", "Congratulations on Your Birthday!", "Merry Christmas!" (these messages are hereinafter referred to as "caption"). A photographer rotates through a plurality of pieces of information stored in the memory to select desired data, and imprints the data on a film using LEDs. Some known cameras use a film having a recording section for recording photographic information thereon, and magnetically records the photographic information on the recording section of the film.

Japanese Patent Laid-Open No. 6-130486 discloses a device which modifies the order of the arrangement of a plurality of pieces of information stored in the memory, according to the frequency of the use of each piece of information.

Japanese Patent Laid-Open No. 5-224290 discloses a camera which includes a GPS (Global Positioning System) receiver and records, on the recording section of a film, position information acquired through the GPS receiver and corresponding place name in accordance with an image being photographed. The GPS receiver is a positioning system that receives data transmitted from a plurality of satellites and fixes its position based on the received data.

In the above conventional cameras, however, the user must rotate through a plurality of pieces of information and select and set the desired information, using information selection means each time the user wants photographic information to be photographed. Setting the photographic data takes time and a photo opportunity may be missed.

When the number of information items stored are large in the device disclosed in Japanese Patent Laid-Open No. 6-130486, which modifies the order of the arrangement of the information, the photographer needs more time to select desired information and may miss a photo opportunity. The same is true of other cameras that arrange information in the order of the frequency of use, regardless of the type of photographing information such as date and site of photographing.

If a camera that imprints place names stored in a memory, according to the site of photographing, is further provided with a function of arranging information according to the order of the frequency of use, the photographer will need more time to set the information and may miss a photo opportunity.

SUMMARY OF THE INVENTION

In one aspect, the present invention is to provide a camera that comprises a selection unit for selecting data, a recording unit for recording the data selected by the selection unit onto an image recording medium, and a changing unit for changing, in accordance with information relating to an image photographed, a selection manner by which the selection unit selects the data, whereby reducing the time required for the selection of desired data and thereby helps the user avoid missing a photo opportunity.

The other aspects of the present invention will become apparent when the following detailed description of the preferred embodiments is considered.

BRIEF DESCRIPTION OF THE DRAWINGS

FIGS. 2A and 2B show a table map according to the first embodiment of the present invention;

FIG. 10 is a block diagram showing a major portion of a camera according to a third embodiment of the present invention;

FIGS. 11A and 11B show a table map according to the third embodiment of the present invention;

FIG. 13, including FIGS. 13A and 13B, is a flow diagram showing the selection operation of caption data in the camera according to the third embodiment of the present invention;

DESCRIPTION OF THE PREFERRED EMBODIMENTS

Figure 1:
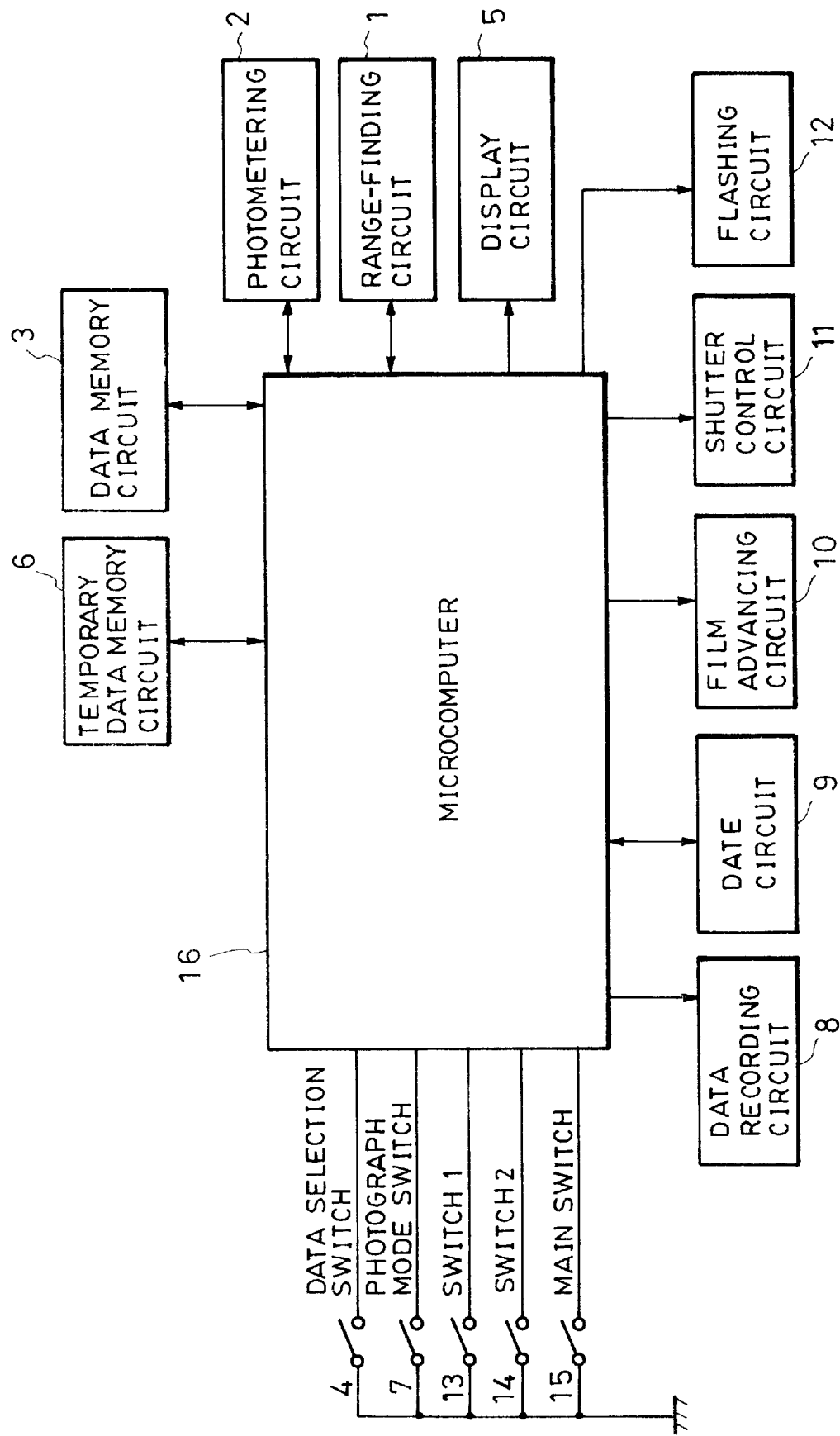
FIG. 1 is a block diagram showing a major portion of a camera according to a first embodiment of the present invention.

Referring now to the drawings, the preferred embodiments of the present invention are discussed.

FIG. 1 is a block diagram showing a major portion of a camera according to a first embodiment of the present invention.

Referring to FIG. 1, a known range-finding circuit 1 determines the range to an object, a known photometering circuit 2 measures luminance of the object, and a data memory circuit 3 stores caption data as a data table. A data selection switch 4 is data selection means for selecting any data from the data stored in the data memory circuit 3, and each pressing of the data selection switch 4 changes (rotates through) the caption data to the next one. A display circuit 5, constructed of a circuit portion and an LCD display, presents the data selected by the data selection switch 4 to the user. A temporary data memory circuit 6 stores in a rearranged order the caption data, stored in the data memory circuit 3, in a sequence to be described later. A photograph mode switch 7 switches a photograph mode, and each pressing of the photograph mode switch 7 switches the photograph mode, from one mode to another. The photograph mode is a control mode which has the optimum setting of exposure condition and camera sequence in consideration of the purpose of photographing, and known photograph modes are, for example, a normal photograph mode (AUTO mode), a closeup mode, a portrait mode, a sports mode, a night-view mode, and a scenery mode. The photograph modes related to this embodiment will be discussed later.

Designated 8 is recording means for recording the data selected by the data selection switch 4 onto a film, and is a data recording circuit for magnetically recording the data onto a recording section of the film in this embodiment. A date circuit 9 is constructed of a timing circuit for giving time data and its output in the form of the time is presented on the LCD display in the display circuit 5. A film advance circuit 10 contains and controls a film advance motor for advancing the film by multiple frames without picture taking, winding the film by one frame, and rewinding the film back. A shutter control circuit 11 controls a shutter, a flashing circuit 12 gives a flash as a result of being charged and then triggered by the luminance of the object, and a switch 13 (hereinafter SW1) is turned on in response to a first stroke pressing of a release switch. When SW1 is turned on, a series of pre-photograph actions such as range finding, photometering, and flashing are carried out. A switch 14 (hereinafter referred to as SW2) is turned on in response to a second stroke pressing of the release switch. When SW2 is turned on, the unshown shutter is opened and then closed again for exposure. A main switch 15 switches on and off the power to the camera, and a microcomputer 16 is a controller for controlling the camera.

Discussed next are the photograph modes incorporated in this camera (normal photograph mode, closeup mode, portrait mode, sports mode, night-view mode and scenery mode).

(1) The normal photograph (AUTO) mode is a typical photograph mode which is programmed based on a standard use of camera. In order to stabilize an image against a camera shake in accordance with a focal length, automatic flashing is performed using the result of photometering and an exposure is corrected when a back lighting is detected.

(2) The closeup mode is programmed to photograph appropriately a closeup picture. An imaging lens is automatically projected for a tele-photo side and a diaphragm is automatically set.

(3) The portrait mode is programmed to photograph appropriately a person, in particular, as an object. Regardless of the result of the photometering, the flash is provided so that a catch light enters the eyes of the person, and the imaging lens is driven such that the person is photographed in the bust up in accordance with the range to the object.

(4) The sports mode is programmed to photograph appropriately an object in fast motion. A single release operation permits a plurality of frames to be photographed consecutively. While SW1 is pressed, AF (autofocus) and AE (autoexposure) are continuously performed to focus continuously on an object moving fast.

(5) The night-view mode is programmed to photograph appropriately a night view. A shutter speed is controlled to match the night view as a background regardless of a camera shake limit time. The exposure is appropriately controlled with the flash lighting the main subject.

(6) The scenery mode is appropriately programmed to photograph an object in the far distance position. The focus is controlled to match the infinity, and the flashing is disabled.

Referring to FIG. 2, the table map stored in the data memory circuit 3 is now discussed.

In a first embodiment of the present invention, one address is constructed of two-byte data. Each address stores a two-byte code corresponding to caption data. From the top of the addresses, four consecutive addresses are assigned to each photograph mode. FIG. 2B shows examples of caption corresponding to the above codes.

Figure 3:
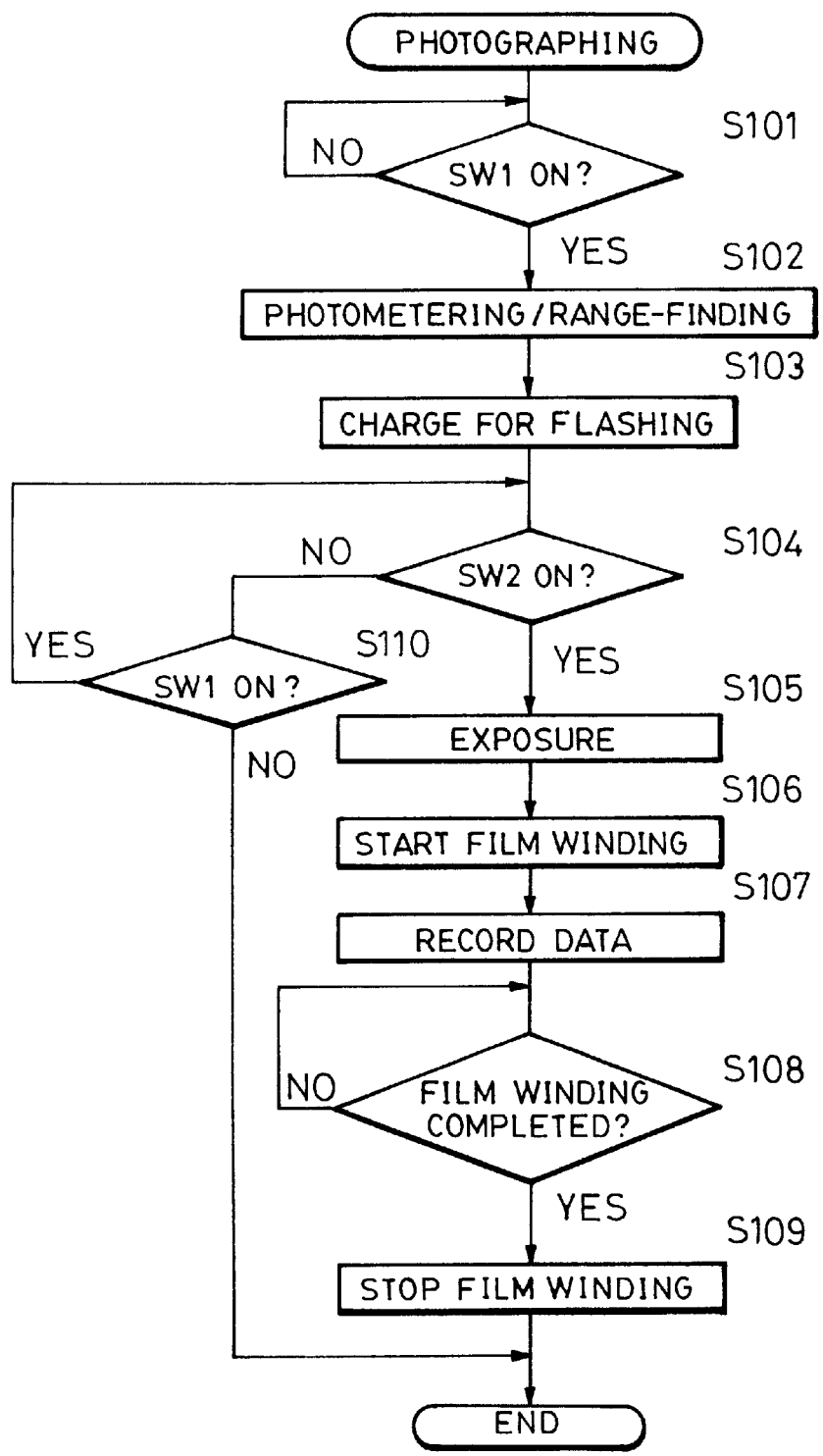
FIG. 3 is a flow diagram showing the operation of the camera according to the first embodiment of the present invention.

Referring to a flow diagram shown in FIG. 3, the photograph sequence of the camera thus constructed, including a data recording, is now discussed.

In step S101, the microcomputer 16 waits until switch SW1 is turned on. After confirming that switch SW1 is turned on, the microcomputer 16 goes to step S102. The microcomputer 16 measures the range to and the luminance of the object using the range-finding circuit 1 and photometering circuit 2. In step S103, a flash unit is charged through the flashing circuit 12, as required. In step S104, the microcomputer 16 checks whether switch SW2 is turned on. When SW2 is not turned on, the microcomputer 16 goes to step S110 to check the status of SW1. When SW1 is turned off, the microcomputer 16 takes no further steps and ends the process.

When switch SW1 is turned on, the microcomputer 16 goes to step S104 to check the status of switch SW2 again. Specifically, when SW1 is ON and SW2 is OFF, steps S104, S110, and then S104 again are cycled through.

After confirming in step S104 that switch SW2 is turned on, the microcomputer 16 goes to step S105 to drive the shutter control circuit 11 and the like for exposure. Subsequent to the exposure operation, the microcomputer 16 goes to step S106 to start film winding with film advance circuit 10. In step S107, in step with the film winding, the microcomputer 16 instructs the data recording circuit 8 to record magnetically on the film, data to be recorded, including the code of a caption that is selected prior to the photograph sequence. In step S108, the microcomputer 16 waits for the end of the film winding, and then goes to step S109 when the film winding is completed. The microcomputer 16 stops the film advance circuit 10 in its film winding operation, and ends a series of photograph sequence.

The code of the caption magnetically recorded onto the film is read when the film is printed in a photofinishing laboratory, and characters corresponding to the code are thus printed on the corresponding picture.

Figure 4:
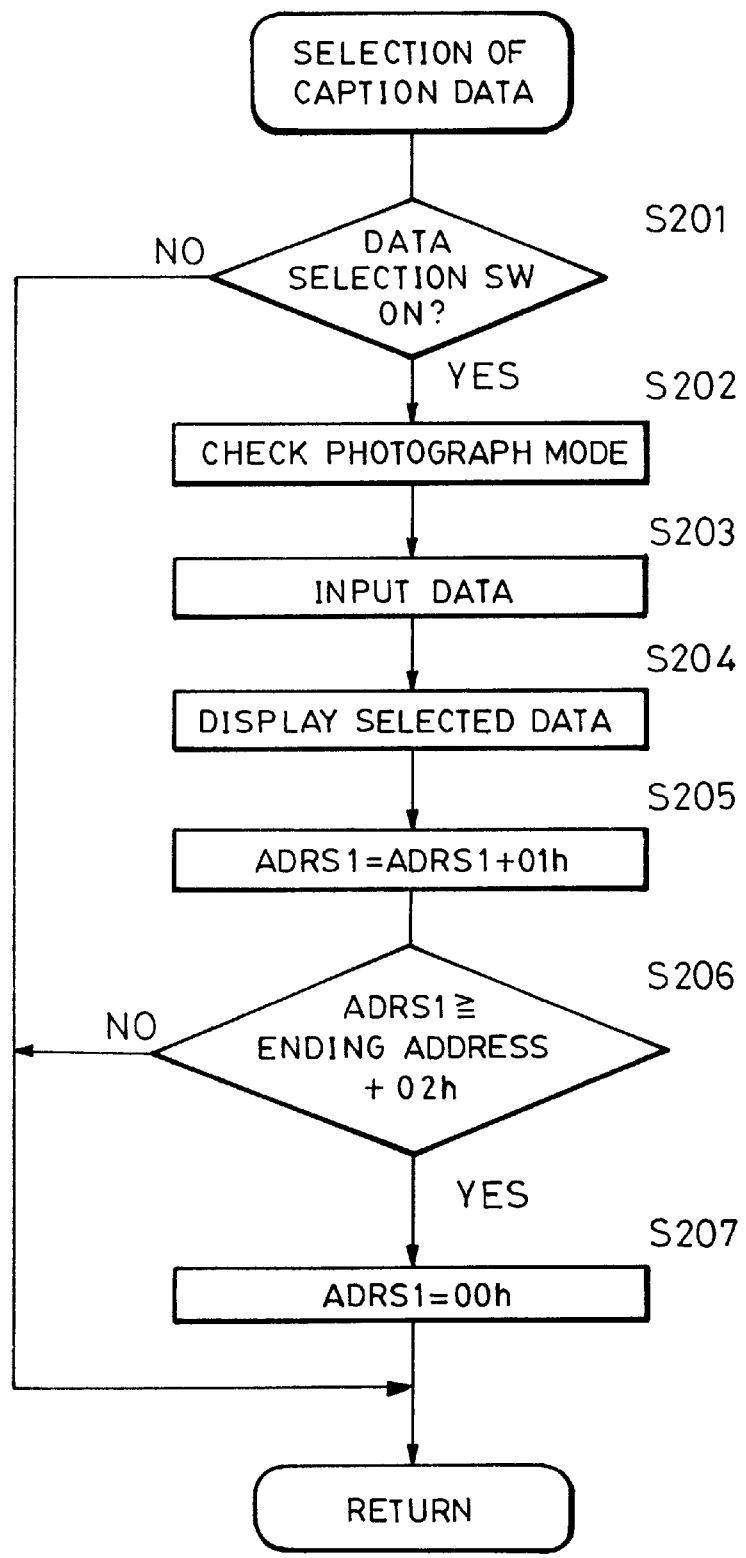
FIG. 4 is a flow diagram showing the selection operation of caption data in the camera according to the first embodiment of the present invention.

The sequence for the caption data selection that is executed prior to the above photograph sequence is now discussed referring to a flow diagram shown in FIG. 4.

In this embodiment, data to be recorded (photographed) onto a film remains to be selected and is not recorded immediately after the power is applied with the main switch 15 turned on.

The flow diagram shown in FIG. 4 shows the process that is executed prior to the photograph sequence, as already described.

In step S201, the microcomputer 16 checks whether the data selection switch 4 is turned on. When the data selection switch 4 is not turned on, the microcomputer 16 ends this process without performing any further step. When the data selection switch 4 is turned on, the microcomputer 16 goes to step S202 to check the photograph mode. In the next step S203, the microcomputer 16 retrieves caption data from the data memory circuit 3 and stores it in the temporary data memory circuit 6. The storage of the caption data in the temporary data memory circuit 6 will be further described later. In step S204, the microcomputer 16 instructs the display circuit 5 to display, on its LCD display, a character string corresponding to the data stored in an address indicated by an address register ADRS1 (not shown). The address register ADRS1 indicates the address in the temporary data memory circuit 6, which is processed in the microcomputer 16.

In step S205, the value of the address register ADRS1 is incremented to indicate an address that stores the next data. In the next step S206, the microcomputer 16 checks whether the value of the address register ADRS1 is greater than the sum of "02h" and the ending address of the area stored in the temporary data memory circuit 6 (since the ending address in this embodiment is "17h", the sum is "19h"). When the value of the address register ADRS1 is greater than the sum, the microcomputer 16 goes to step S207, and clears the address and sets "00h" in the address for the address register ADRS1. The suffix "h" here denotes a hexadecimal number. When the value of the address register is the sum, which is obtained by adding "01h" to the ending address, namely, "18h", the camera is in the mode in which the caption data is unselected with no caption to be recorded onto the film, namely, in a data record off mode. When the address register ADRS1 is "18h" in step S204, the LCD display presents no display at all. The address register ADRS1 is set to any value within a range of "00h" to "18h", and one of the captions is selected with the address register ADRS1 from "00h" to "17h", and no caption is selected with the address register ADRS1 at "18h" (in the data record off mode).

Since this sequence is repeated each time the data selection switch 4 is pressed, the caption data stored in the data memory circuit 3 is rotated through and selected.

Figure 5A:
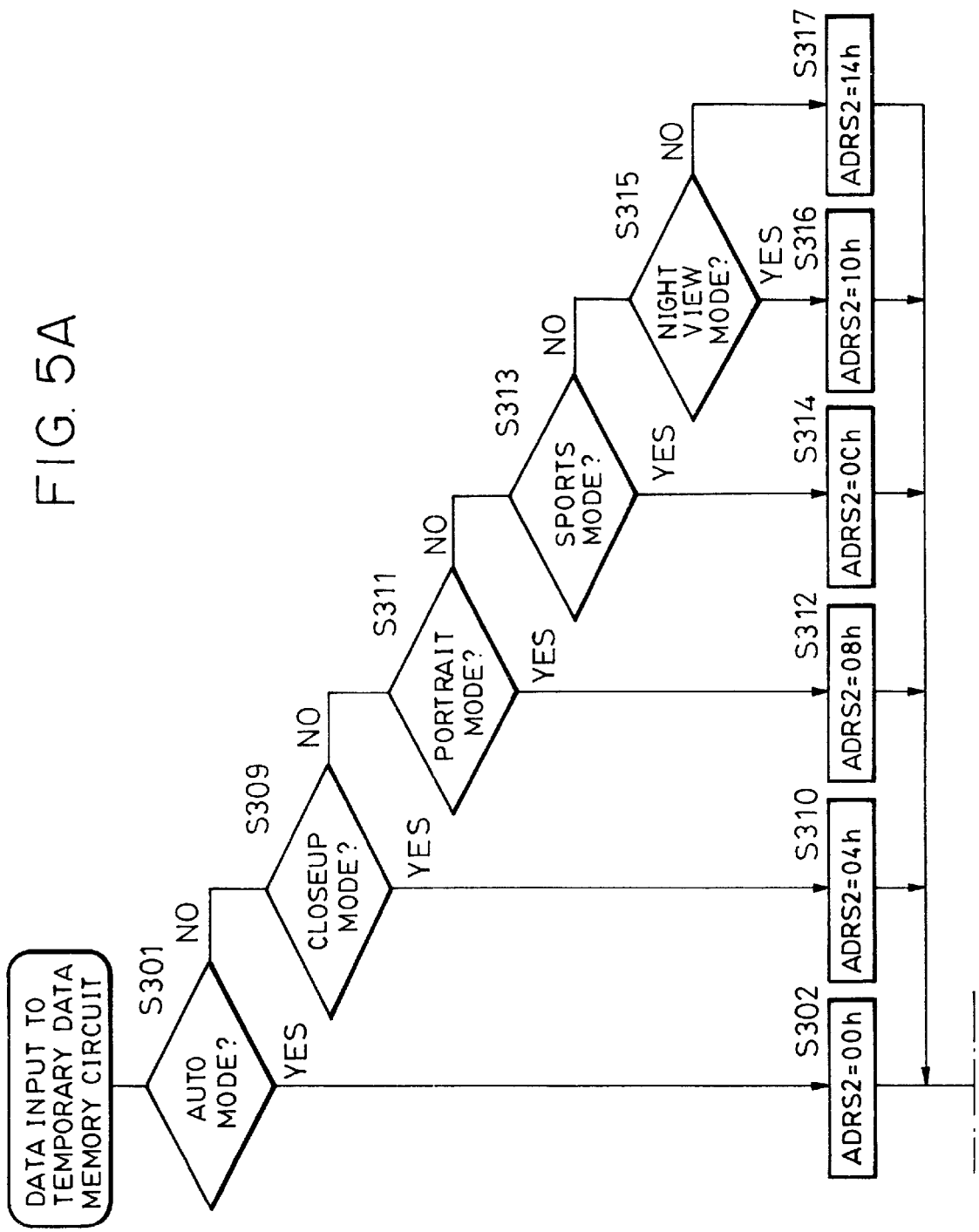
FIGS. 5A and 5B, is a flow diagram showing the rearrangement operation of the caption data in the camera according to the first embodiment of the present invention.
Figures 5, 5B:
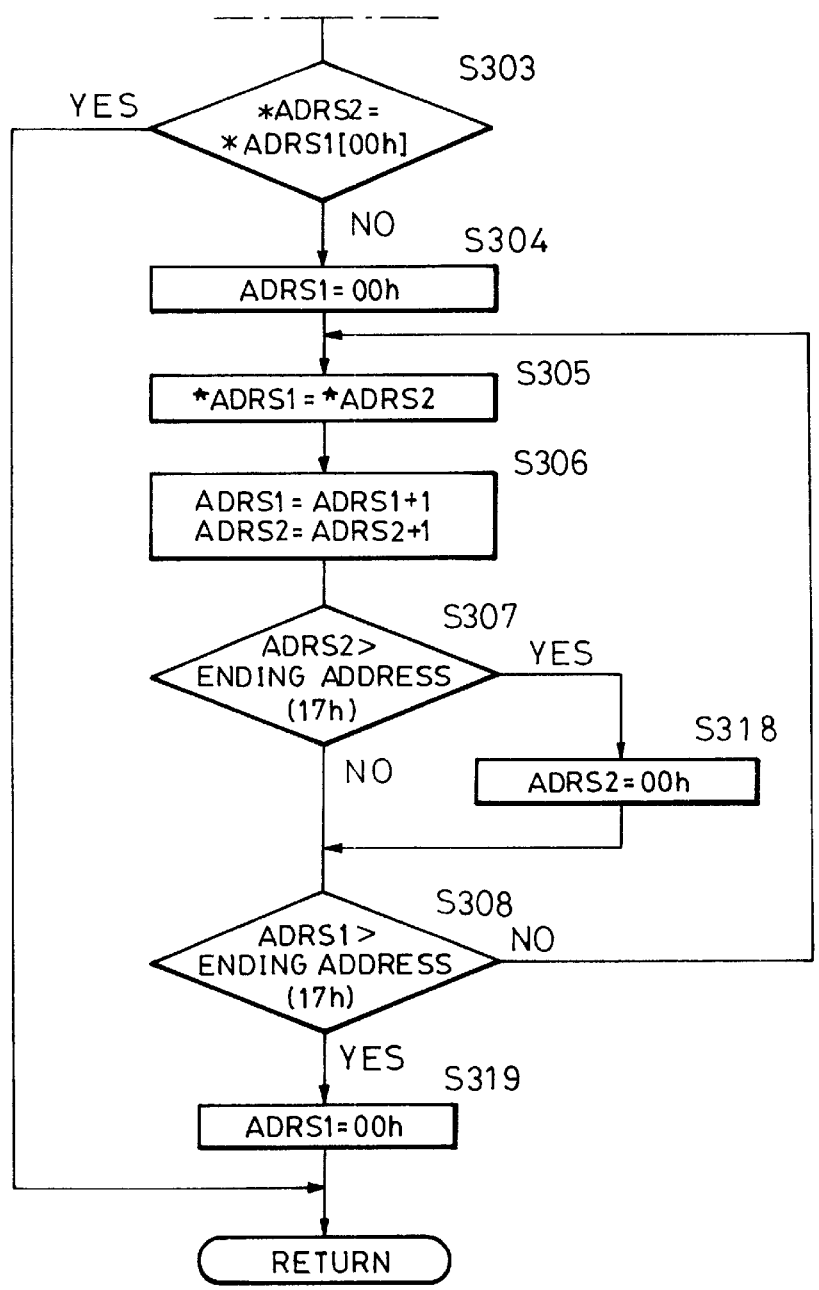
FIG. 5, including

The sequence of data input from the data memory circuit 3 to the temporary data memory circuit 6 is now discussed referring to a flow diagram shown in FIG. 5.

In step S301, the microcomputer 16 determines whether the photograph mode checked in step S202 in the flow diagram shown in FIG. 4 is the AUTO mode. When it is the AUTO mode, the microcomputer 16 goes to step S302 to set "00h" to an address register ADRS2. The address register ADRS2 indicates the address of the data memory circuit 3, which is processed in the microcomputer 16. Upon setting "00h" to the address register ADRS2, the microcomputer 16 goes to step S303.

When it is determined in step S301 that the photograph mode is not the AUTO mode, the microcomputer 16 goes to step S309 to determine whether the photograph mode is the closeup mode. When it is determined that the photograph mode is the closeup mode, the microcomputer 16 goes to step S310 to set "04h" to the address register ADRS2. Upon setting "04h" to the address register ADRS2, the microcomputer 16 goes to step S303.

When it is determined in step S309 that the photograph mode is not the closeup mode, the microcomputer 16 goes to step S311 to determine whether the photograph mode is the portrait mode. When it is determined that the photograph mode is the portrait mode, the microcomputer 16 goes to step S312 to set "08h" to the address register ADRS2. Upon setting "08h" to the address register ADRS2, the microcomputer 16 goes to step S303.

When it is determined in step S311 that the photograph mode is not the portrait mode, the microcomputer 16 goes to step S313 to determine whether the photograph mode is the sports mode. When it is determined that the photograph mode is the sports mode, the microcomputer 16 goes to step S314 to set "0Ch" to the address register ADRS2. Upon setting "0Ch" to the address register ADRS2, the microcomputer 16 goes to step S303.

When it is determined in step S313 that the photograph mode is not the sports mode, the microcomputer 16 goes to step S315 to determine whether the photograph mode is the night-view mode. When it is determined that the photograph mode is the night-view mode, the microcomputer 16 goes to step S316 to set "10h" to the address register ADRS2. Upon setting "10h" to the address register ADRS2, the microcomputer 16 goes to step S303.

When it is determined in step S315 that the photograph mode is not the night-view mode, the photograph mode is the scenery mode and the microcomputer 16 goes to step S317 to set "14h" to the address register ADRS2. Upon setting "14h" to the address register ADRS2, the microcomputer 16 goes to step S303.

When the setting of the address register ADRS2 is completed in accordance with the photograph mode in this way, the microcomputer 16 goes to step S303.

Step S303 and subsequent steps are the process for inputting the code, corresponding to the caption stored in the data memory circuit 3, to the temporary data memory circuit 6. The process is now discussed.

In step S303, the microcomputer 16 checks to see if the content at the address of the data memory circuit 3, indicated by the address register ADRS2, coincides with the content stored at the address "00h" in the temporary data memory circuit 6. When the two contents coincide with each other, the microcomputer 16 ends the process without performing any further step. The fact that the content at the address of the data memory circuit 3, indicated by the address register ADRS2, coincides with the content stored at the address "00h" in the temporary data memory circuit 6 means that there is no modification in the photograph mode between the current process and the previous process when the data selection switch 4 was pressed for the last time.

When the two contents do not coincide, the microcomputer 16 goes to step S304 to clear the address register ADRS1 and set "00h" to the address register ADRS1. In step S305, the content in the data memory circuit 3, indicated by the address register ADRS2, is input to the address of the temporary data memory circuit 6 indicated by the address register ADRS1. In step S306, both address registers ADRS1 and ADRS2 are respectively incremented to indicate the next addresses (by adding "01h" thereto).

In step S307, the microcomputer 16 checks whether the value of the address register ADRS2 is greater than the ending address ("17h" in this embodiment) of the area storing the caption data. When the value is smaller than the ending address, the microcomputer 16 goes to step S308 and clears the address register ADRS2 to set "00*h*" therein. In step S308, the microcomputer 16 checks whether the value of the address register ADRS1 is greater than "17*h*". When it the value not greater than "17*h*", the microcomputer 16 returns to step S305, and these steps are repeated until the value of the address register ADRS1 becomes greater than the ending address.

When the above repeated cycles are completed, the temporary data memory circuit 6 holds caption codes corresponding to the photograph modes, in upper addresses from the address "00*h*" down.

In step S319, the value of the address register ADRS1 is cleared to "00*h*", and the sequence of the data input from the data memory circuit 3 to the temporary data memory circuit 6 is completed. The microcomputer 16 then returns to step S203. Specifically, when the data selection switch 4 is pressed for the first time from a change of the photograph mode, the caption data related to the photograph mode is first selected and presented on the LCD display.

According to the first embodiment of the present invention, the order of the arrangement of the codes corresponding to the captions stored in the data memory circuit 3 is modified and then stored in the temporary data memory circuit 6 in accordance with the photograph mode in which the data selection switch 4 selects the caption data. The selection sequence of the captions is thus modified. By arranging first the captions closely related to the photograph mode, a caption that is likely to be selected by the user may be selected quickly. The camera thus reduces the time required to set the caption data and helps the photographer avoid missing a photo opportunity.

In the camera of the first embodiment, the caption data is converted into a two-byte code corresponding to its data and is then recorded onto the film, and converted into characters during a print operation. It is perfectly acceptable to record ASCII codes representing characters rather than recording the code corresponding to a caption. In one such method, the code stored in the data memory circuit 3 may be set to be an address in a different area within the data memory circuit 3. Character codes (ASCII codes) corresponding to a character string are stored in the area represented by the address, and are then recorded onto the film. In another method, character codes (ASCII codes) corresponding to a character string are directly stored in the data memory circuit 3 and the character string is then recorded onto the film.

In the latter method, the values of the address registers ADRS1 and ADRS2 have to be increased by the number of character strings in response to the selection of data.

In the first embodiment, the data is magnetically recorded onto the film. The present invention is not limited to this method. Any method is acceptable as long as the caption data corresponding to the image being photographed is recorded and the corresponding character is photographed onto a print. A memory may be arranged onto a film cartridge, and the data may be stored in the memory. Also acceptable is a conventionally available method in which selected caption data is converted into characters, which are then photographed onto the film using an LED or the like.

According to the first embodiment, the order of the arrangement of the caption data, namely, the order of the selection of the caption data is modified according to the selected photograph mode. Alternatively, the order of the selection of the caption data may be modified according to the flashing mode or other photographing information such as date and time rather than the photograph mode.

The method of modifying the order of the selection of the caption data is not limited to the one shown in the first embodiment. Any method is acceptable as long as it modifies the order of the selection according to information about photographing.

The caption data selected in the photograph mode may have a priority over the other in the next selection and may be selected first. The priority may be modified according to the frequency of use of the caption data. The data with the modified arrangement order may be restored in the data memory circuit that is of a nonvolatile memory type.

Figure 6:
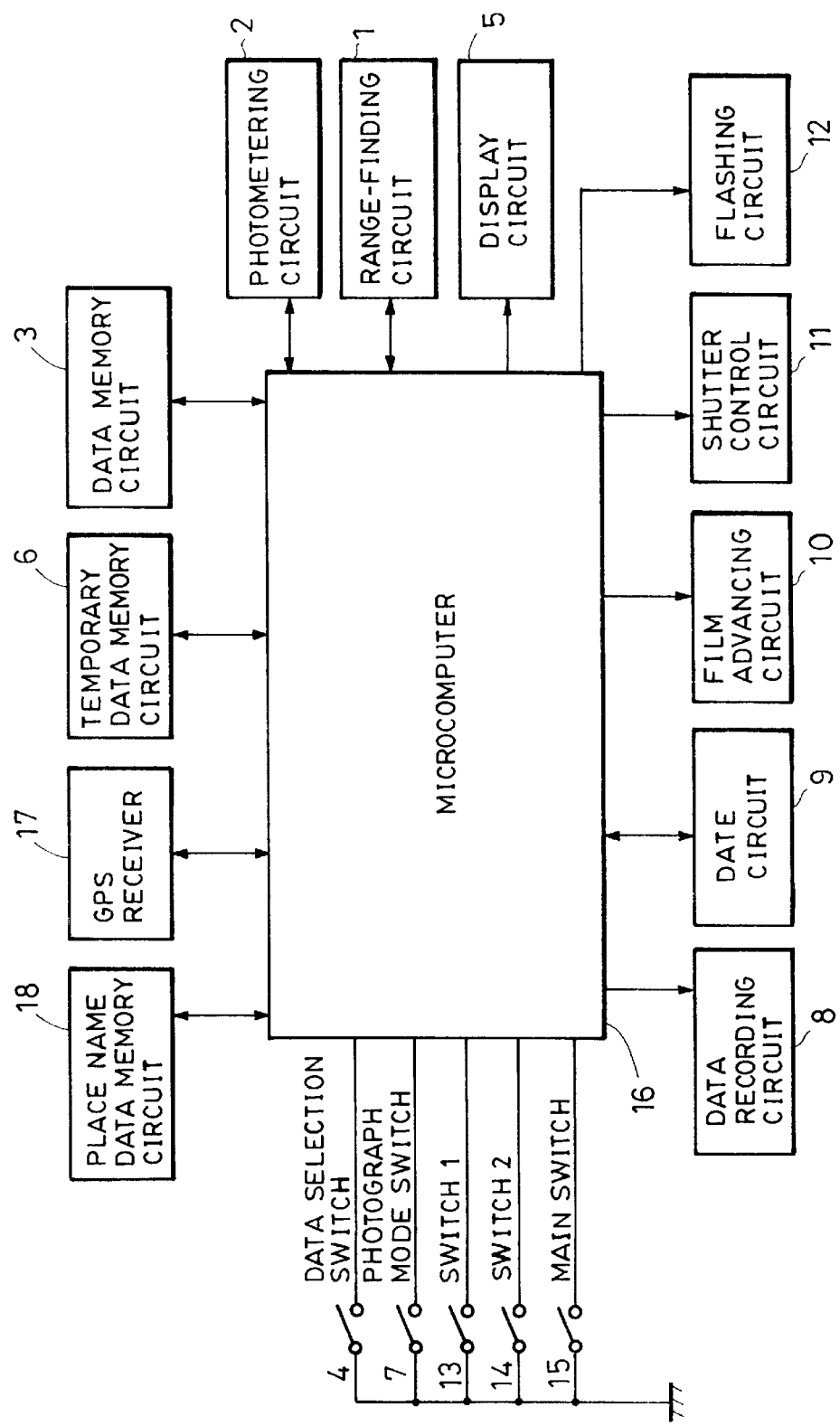
FIG. 6 is a block diagram showing a major portion of a camera according to a second embodiment of the present invention.

FIG. 6 is a block diagram showing a major portion of a camera according to a second embodiment of the present invention. In FIG. 6, components identical to those described with reference to FIG. 1 are designated with the same reference numerals.

As shown, a GPS receiver 17 is position fixing means for receiving the radio wave from unshown satellites and outputting position information, and a place name data memory circuit 18 stores place name or geographical name information.

The photograph sequence in the second embodiment is identical to that in the first embodiment (sequence shown in FIG. 3), and the discussion about it is not repeated here.

Figure 7:
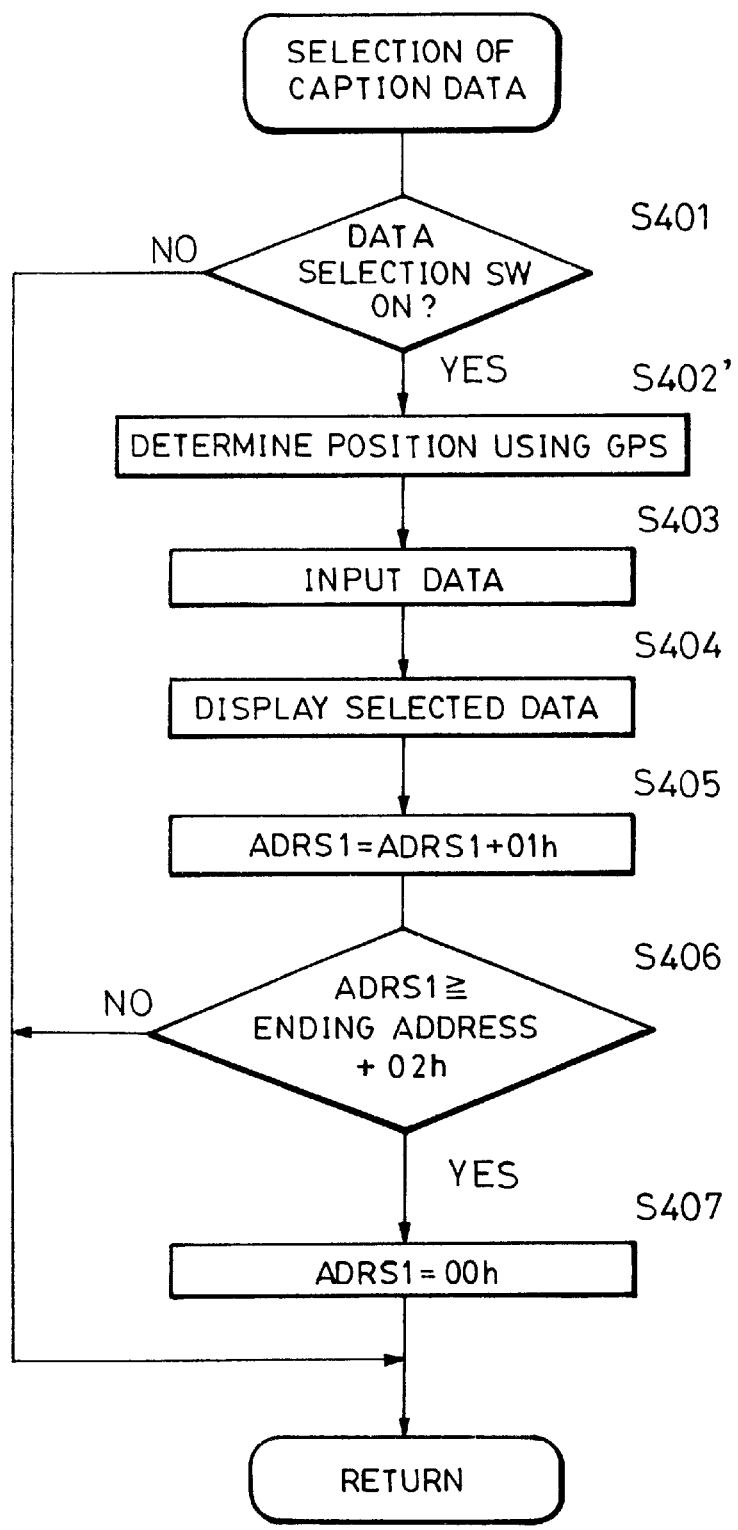
FIG. 7 is a flow diagram showing the selection operation of caption data in the camera according to the second embodiment of the present invention.

Referring to a flow diagram shown in FIG. 7, the data selection sequence in the camera of the second embodiment of the present invention is now discussed. Since step numbers in FIG. 7 which are equal to those in FIG. 4 in the 10's unit and 1's unit perform the same process described with reference to FIG. 4, the different process only is discussed here. In this embodiment, every four pieces of caption data relating to the position information are arranged in the same group and stored in the data memory circuit 3.

The difference between the first and second embodiment lies in step S402'. In the second embodiment, the microcomputer 16 receives position fix data from the GPS receiver 17 to check its own position instead of checking the photograph mode. In step S403, the microcomputer 16 inputs the caption data from the data memory circuit 3 to the temporary data memory circuit 6. The process thereafter remains unchanged from that in the first embodiment.

Figures 8, 8A:
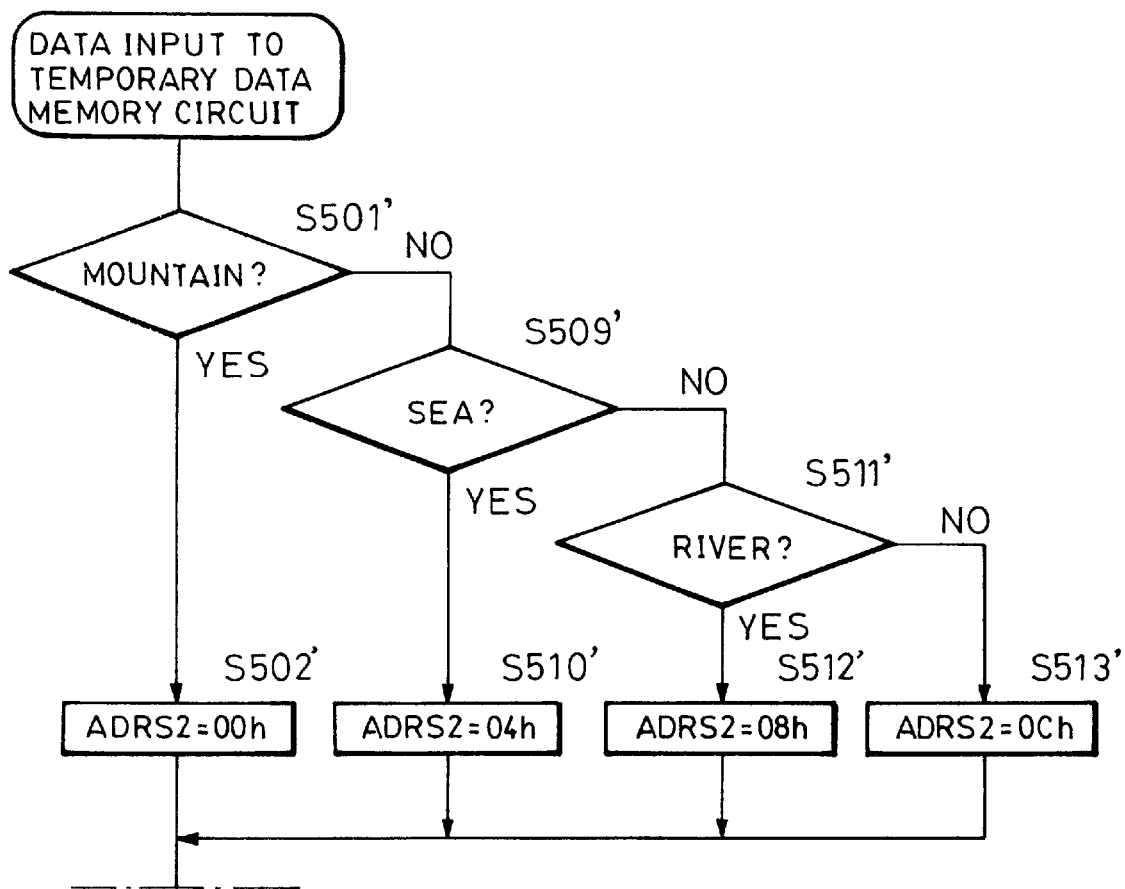
FIG. 8, including
FIGS. 8A and 8B, is a flow diagram showing the rearrangement operation of the caption data in the camera according to the second embodiment of the present invention.
Figure 8B:
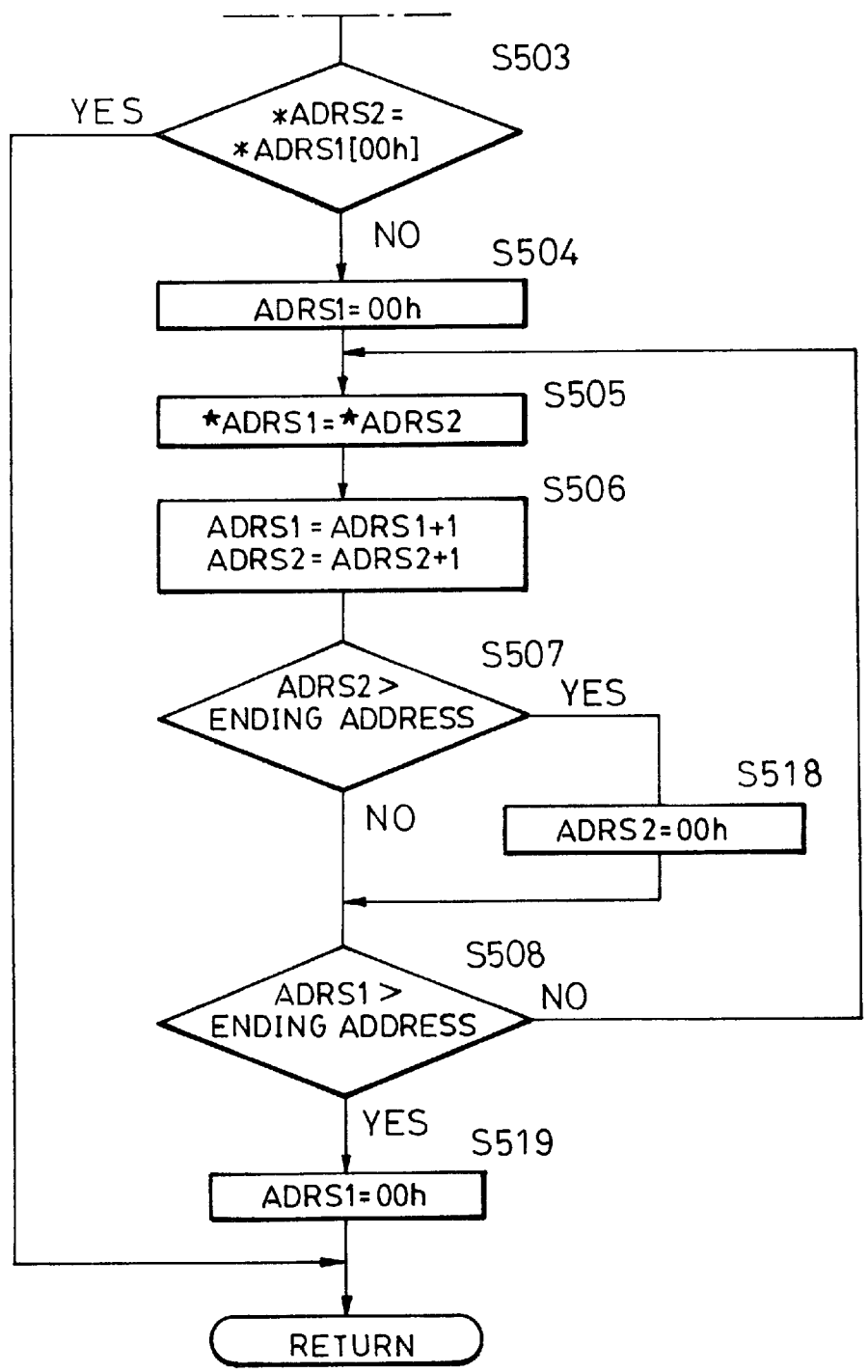

Referring to a flow diagram shown in FIG. 8, the data input to the temporary data memory circuit 6 is discussed. Since step numbers in FIG. 8 which are equal to those in FIG. 5 in the 10's unit and 1's unit perform the same process described with reference to FIG. 5, the different process only is discussed here.

The place name data memory circuit 18 is referenced for the place name based on the position information obtained in step S402', and the place name is classified according to geographical features such as mountains, seas, and rivers and is then converted into a predetermined code. For example, mountains are "00*h*", seas are "04*h*", rivers are "08*h*", and the other features are "1Ch" so that the geographical features are differently coded, one feature to another, with an increment of "04*h*" therebetween. The geographical code is then set in the address register ADRS2. The geographical codes indicate the addresses in the data memory circuit 3 that stores the captions in a manner that data relating to the position information are grouped. Specifically, four captions are prepared for each geographical feature; for example, the captions may be "Hey!, Hiking, . . . " for the mountain, "Shell Gathering, Sea Bathing, . . . " for the sea, "Fishing, River Boating, . . . " for the river, and the codes respectively corresponding to the captions are stored according to the geographical feature in the data memory circuit 3.

In step S501', the microcomputer 16 determines whether the position information is the geographical feature "mountain". When it is the geographical feature "mountain", the microcomputer 16 goes to step S502' to set "00h" to the address register ADRS2. Upon setting "00h" to the address register ADRS2, the microcomputer 16 goes to step S503.

When it is determined in step S501' that the position information does not indicate the geographical feature "mountain", the microcomputer 16 goes to step S509' to determine whether the position information indicates the geographical feature "sea". When it is determined that the position information indicates the geographical feature "sea", the microcomputer 16 goes to step S510' to set "04h" to the address register ADRS2. Upon setting "04h" to the address register ADRS2, the microcomputer 16 goes to step S503.

When it is determined in step S509' that the position information does not indicate the geographical feature "sea", the microcomputer 16 goes to step S511' to determine whether the position information indicates the geographical feature "river". When it is determined that the position information indicates the geographical feature "river", the microcomputer 16 goes to step S512' to set "08h" to the address register ADRS2. Upon setting "08h" to the address register ADRS2, the microcomputer 16 goes to step S503.

When it is determined in step S511' that the position information does not indicate the geographical feature "river", the microcomputer 16 goes to step S513' to set "1Ch" to the address register ADRS2. Upon setting "1Ch" to the address register ADRS2, the microcomputer 16 goes to step S503.

When the setting of the address register ADRS2 is completed in accordance with each photograph mode, the microcomputer 16 goes to step S503 in any case.

In step S503, the microcomputer 16 checks to see if the content at the address of the data memory circuit 3, indicated by the address register ADRS2, coincides with the content stored at the address "00h" in the temporary data memory circuit 6. When the two contents coincide with each other, the microcomputer 16 ends the process without performing any further step. The fact that the content at the address of the data memory circuit 3, indicated by the address register ADRS2, coincides with the content stored at the address "00h" in the temporary data memory circuit 6 means that there is no change in the position information between the current process and the previous process when the data selection switch 4 was pressed for the last time.

When the two contents do not coincide, the microcomputer 16 goes to step S504. Step S504 and subsequent steps take the same sequence as the one for the data input from the data memory circuit 3 to the temporary data memory circuit 6 in the first embodiment. The caption data relating to the position information is sequentially input to the temporary data memory circuit 6 from its top address down. Specifically, when the data selection switch 4 is pressed for the first time from a change in the position information, the caption data relating to the position information is first selected and presented on the LCD display. Since this sequence is repeatedly executed each time the data selection switch 4 is pressed, the caption data stored in the data memory circuit 3 is rotated through and selected.

According to the second embodiment of the present invention, the order of the arrangement of the codes corresponding to the captions stored in the data memory circuit 3 is modified and then stored in the temporary data memory circuit 6 in accordance with the position information the GPS receiver 17 acquires at the pressing of the data selection switch 4. The selection order of the captions is thus modified. By arranging first the captions closely related to the position information, a caption that is likely to be selected by the user may be selected quickly. The camera thus reduces the time required to set the caption data and helps the photographer avoid missing a photo opportunity.

In the second embodiment, the place name data memory circuit 18 may be replaced with the data memory circuit 3. The data memory circuit 3 may store place names in a hierarchical fashion so that the geographical data may be quickly hierarchically rearranged in response to the position information of the GPS receiver 17. A place name is thus quickly selected so that the geographical code or the place name itself may be recorded onto the film.

Figure 9:
FIG. 9 shows the rearrangement operation of the data map according to the second embodiment of the present invention.

As shown in FIG. 9, for example, the captions arranged in the order of "Tokyo", "Minato-ku", "Tokyo Tower", "Kanagawa", "Yokohama", "Chinese Quarter" and so on may be rearranged in the order of "Kanagawa", "Yokohama", "Chinese Quarter", "Tokyo", "Minato-ku" and "Tokyo Tower" according to the position information.

In the second embodiment, the geographical area is determined referring to the position information from the GPS receiver 17. A device may be provided for the photographer to designate a position and the selection order of the captions may be modified according to the designated position.

The method of modifying the order of the selection of the caption data is not limited to the one shown in the first embodiment. Any method is acceptable as long as it modifies the order of the selection according to the position information.

FIG. 10 is a block diagram showing a major portion of a camera according to a third embodiment of the present invention. In FIG. 10, components identical to those described with reference to FIG. 6 are designated with the same reference numerals.

The difference between the third embodiment and the second embodiment shown in FIG. 6 is that a data table selection switch 19 is added. As will be described later, the data table selection switch 19 is the one for selecting any data table from a plurality of data tables.

The photograph sequence of the third embodiment remains identical to that of the first embodiment (sequence shown in FIG. 3), and the discussion about it is not repeated here.

The table map of the data memory circuit 3 in the camera according to the third embodiment is now discussed, referring to a flow diagram shown in FIG. 11.

In this embodiment, one address is constructed of two-byte data. Each address stores a two-byte code corresponding to caption data. From address "04h" down, a plurality of data tables are arranged and stored.

Three types of data tables are employed in the third embodiment. The first type is a photograph mode table, in which codes corresponding to the photograph mode are stored in 24 addresses ranging from "04h" to "1Bh". The second type is a place name table, in which codes corresponding to the place name are stored in 12 addresses ranging from "1Ch" to "27h". The third type is a date table, in which codes corresponding to the date are stored in 24 addresses ranging from "28h" to "3Fh". Top three addresses store codes indicative of a starting address of each table. The starting address "0004h" of the photograph mode table is stored in "00h", the starting address "001Ch" of the place name data table is stored in "01h", and the starting address "0028h" of the date table is stored "02h", and the ending address "40h" of the memory area is stored in "03h".

Figure 12:
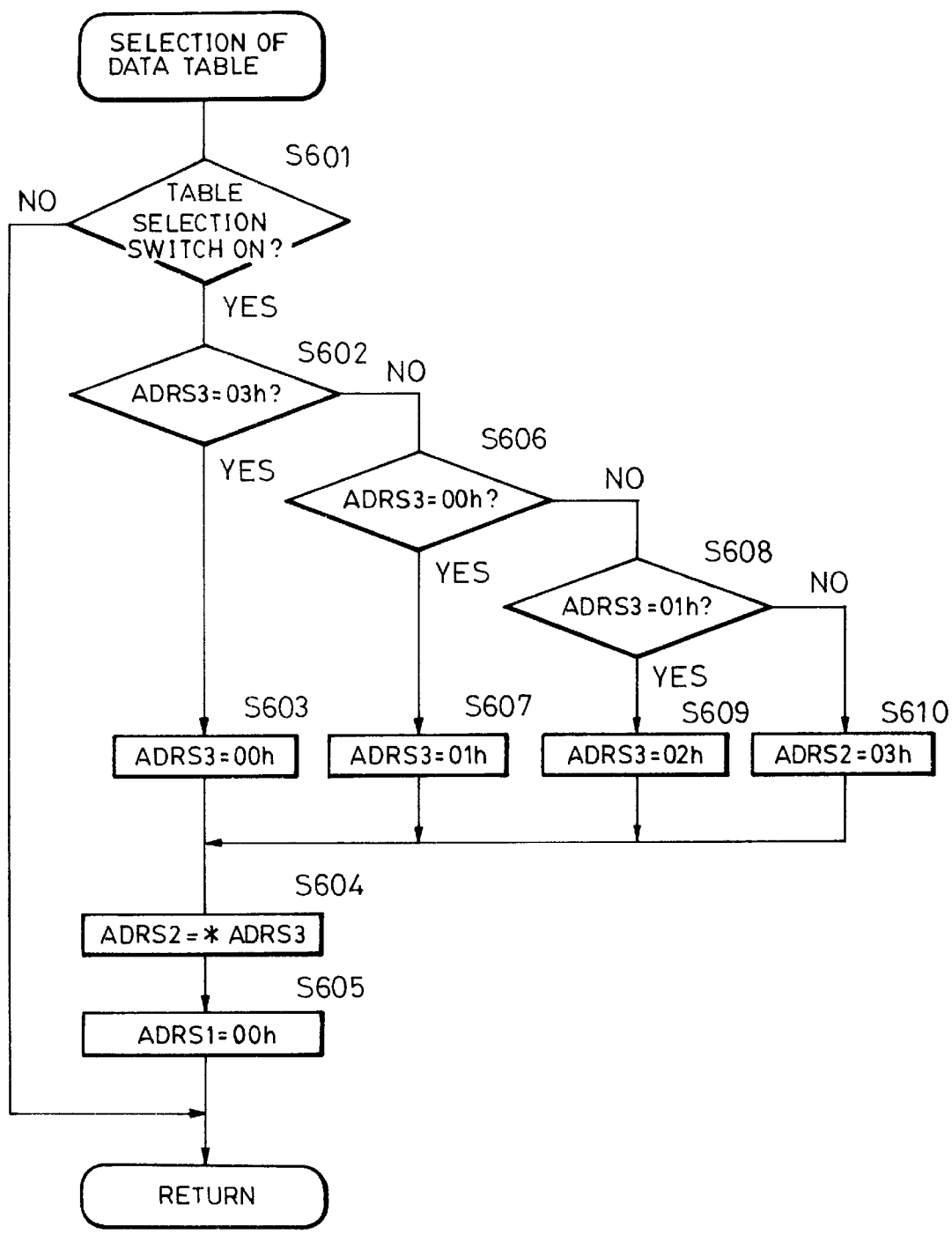
FIG. 12 is a flow diagram showing the selection operation of data table in the camera according to the third embodiment of the present invention.

The table selection sequence of the table map constructed as shown in FIG. 11 is discussed referring to a flow diagram shown in FIG. 12. The following sequence is executed prior to the selection sequence of the caption data.

In step S601, the microcomputer 16 checks whether the data table selection switch 19 is turned on. When the data table selection switch 19 is not turned on, the microcomputer 16 ends the following process without performing any further steps.

When the data table selection switch 19 is turned on, the microcomputer 16 goes to step S602 to check the value of an address register ADRS3. The address register ADRS3 stores the type of data table: for "00h", the microcomputer 16 determines that the photograph mode table is set; for "01h", the microcomputer 16 determines that the place name table is set; for "02h", the microcomputer 16 determines that the date table is set; and for "03h", the microcomputer 16 determines that no table is selected. The address register ADRS3 is designed to indicate the address of the data memory circuit 3 as well. When the value of the data memory circuit 3 is "03h", no table is selected, and a mode in which no caption is recorded on the film, namely, data record off mode, is selected.

When the address register ADRS3 holds "03h" in step S602, the microcomputer 16 goes to step S603 to set "00h" to the address register ADRS3. Upon setting "00h" to the address register ADRS3, the microcomputer 16 goes to step S604.

When it is determined in step S602 that the address register ADRS3 does not hold "03h", the microcomputer 16 goes to step S606 to determine whether the address register ADRS3 holds "00h". When it is determined that the address register ADRS3 holds "00h", the microcomputer 16 goes to step S607 to set "01h" to the address register ADRS3. Upon setting "01h" to the address register ADRS3, the microcomputer 16 goes to step S604.

When it is determined in step S606 that the address register ADRS3 does not hold "00h", the microcomputer 16 goes to step S608 to determine whether the address register ADRS3 holds "01h". When it is determined that the address register ADRS3 holds "01h", the microcomputer 16 goes to step S609 to set "02h" to the address register ADRS3. Upon setting "02h" to the address register ADRS3, the microcomputer 16 goes to step S604.

When it is determined in step S608 that the address register ADRS3 does not store "01h", the microcomputer 16 goes to step S610 to set "03h" to the address register ADRS3. Upon setting "03h" to the address register ADRS3, the microcomputer 16 goes to step S604.

When the setting of the address register ADRS3 is completed, the microcomputer 16 goes to step S604 in any case. The data of the address of the data memory circuit 3, indicated by the address register ADRS3, is set in the address register ADRS2. The address register ADRS2 indicates the address of the data memory circuit 3. In step S605, "00h" is set to the address register ADRS1 indicative of the address of the temporary data memory circuit 6, and a series of process steps end.

Since the above sequence is repeated each time the data table selection switch 19 is pressed, the data tables are rotated through and selected.

Figure 13A:
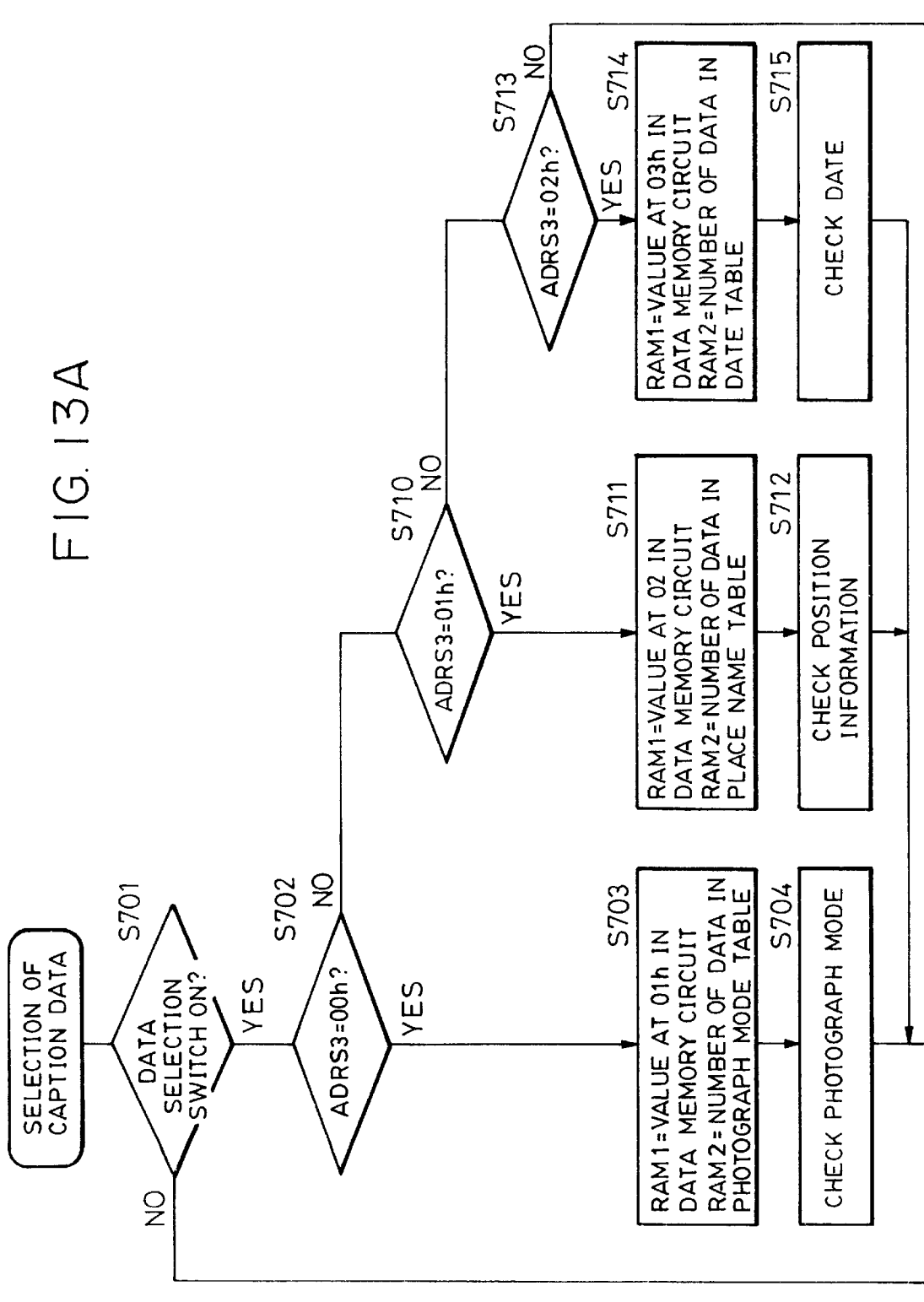

Referring to a flow diagram shown in FIG. 13, the selection sequence of the caption data is now discussed.

In step S701, the microcomputer 16 checks whether the data selection switch 4 is turned on. When it is not turned on, the microcomputer 16 ends the sequence without performing any further steps. When the data selection switch 4 is turned on, the microcomputer 16 goes to step S702 and checks the data table selected referring to the value of the address register ADRS3. The microcomputer 16 here determines whether the value of the address register ADRS3 is "00h". When it is determined that the value is "00h", the microcomputer 16 goes to step S703, where the value at the address "01h" in the data memory circuit 3 is set to RAM1 and the difference between the values at addresses "01h" and "00h" in the data memory circuit 3 is set to RAM2. In this embodiment, "1Ch" is set to RAM1 and "18h" is set to RAM2. RAM1 and RAM2 are memory means (not shown) provided in the microcomputer 16.

Figure 15:
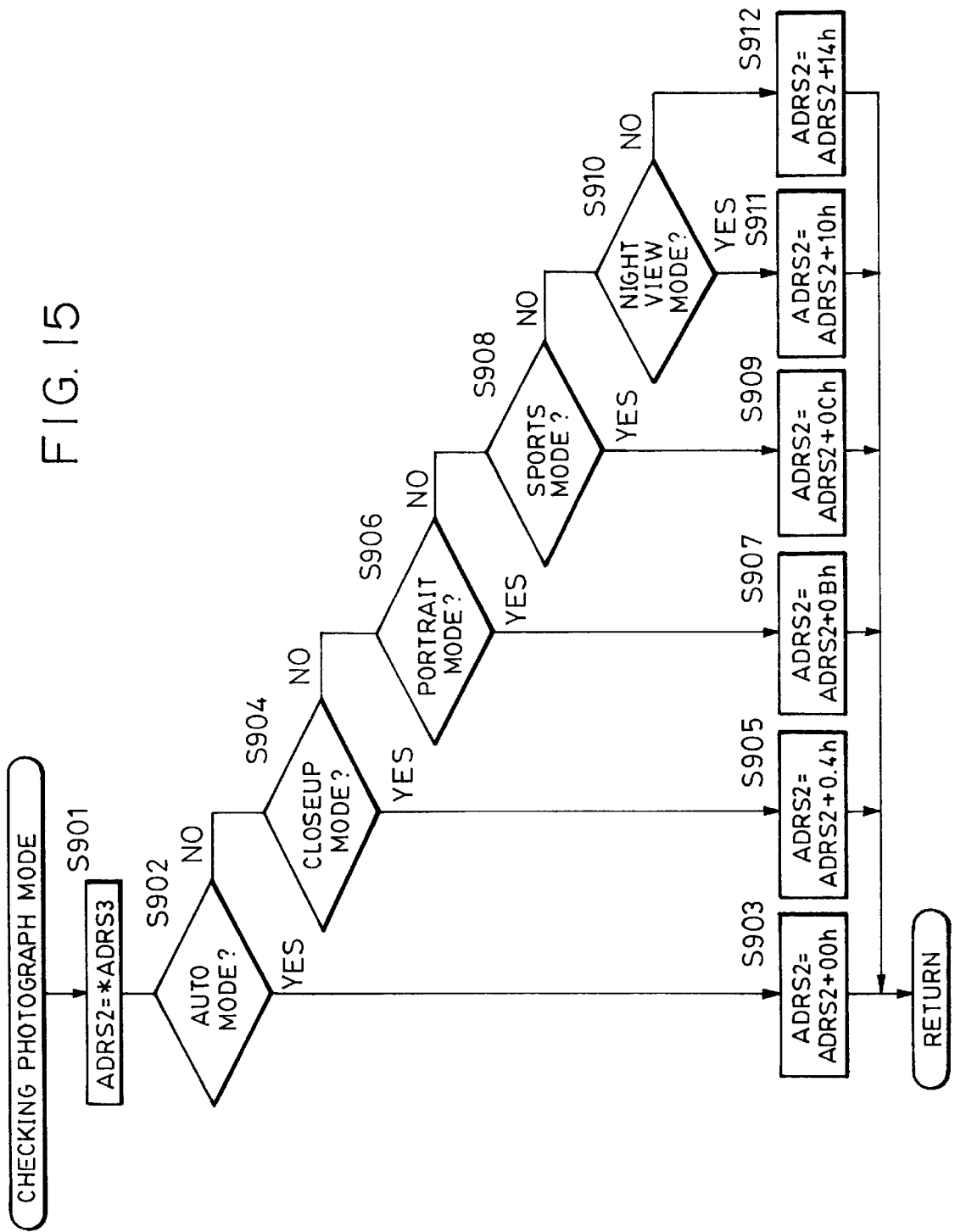
FIG. 15 is a flow diagram showing the checking operation of a photograph mode of the camera according to third embodiment of the present invention.

The microcomputer 16 goes to step S704 to check the photograph mode. This process is discussed below referring to a flow diagram shown in FIG. 15. The photograph modes and their caption data in third embodiment are identical to those in the first embodiment.

In step S901, the value of the address register ADRS3 is set to the address register ADRS2. In step S902, the microcomputer 16 determines whether the photograph mode is the AUTO mode. When it is determined that the photograph mode is the AUTO mode, the microcomputer 16 goes to step S903 to add "00h" to the address register ADRS2.

When it is determined in step S902 that the photograph mode is not the AUTO mode, the microcomputer 16 goes to step S904 to determine whether the photograph mode is the closeup mode. When it is determined that the photograph mode is the closeup mode, the microcomputer 16 goes to step S905 to add "04h" to the address register ADRS2.

When it is determined in step S904 that the photograph mode is not the closeup mode, the microcomputer 16 goes to step S906 to determine whether the photograph mode is the portrait mode. When it is determined that the photograph mode is the portrait mode, the microcomputer 16 goes to step S907 to add "08h" to the address register ADRS2.

Checking further the photograph mode in the same manner as above, the microcomputer 16 adds "0Ch" for the sports mode in step S909, adds "10h" for the night-view mode in step S910, or adds "14h" for the scenery mode in step S912, respectively to the address register ADRS2, and ends the checking process of the photograph mode, and then goes to step S705 shown in FIG. 13.

Returning to FIG. 13, the microcomputer 16 in step S702 determines whether the value of the address register ADRS3 is "00h". When it is determined in step S702 that the value of the address register ADRS3 is not "00h", the microcomputer 16 goes to step S710 to determine whether the address register ADRS3 holds "01h". When the address register ADRS3 holds "01h", the microcomputer 16 goes to step S711, where the value at address "02h" in the data memory circuit 3 is set to RAM 1 and the difference between the values at addresses "02h" and "01h" in the data memory circuit 3 is set to RAM2. In this embodiment, "28h" is set to RAM1 and "0Ch" is set to RAM2.

Figure 16:
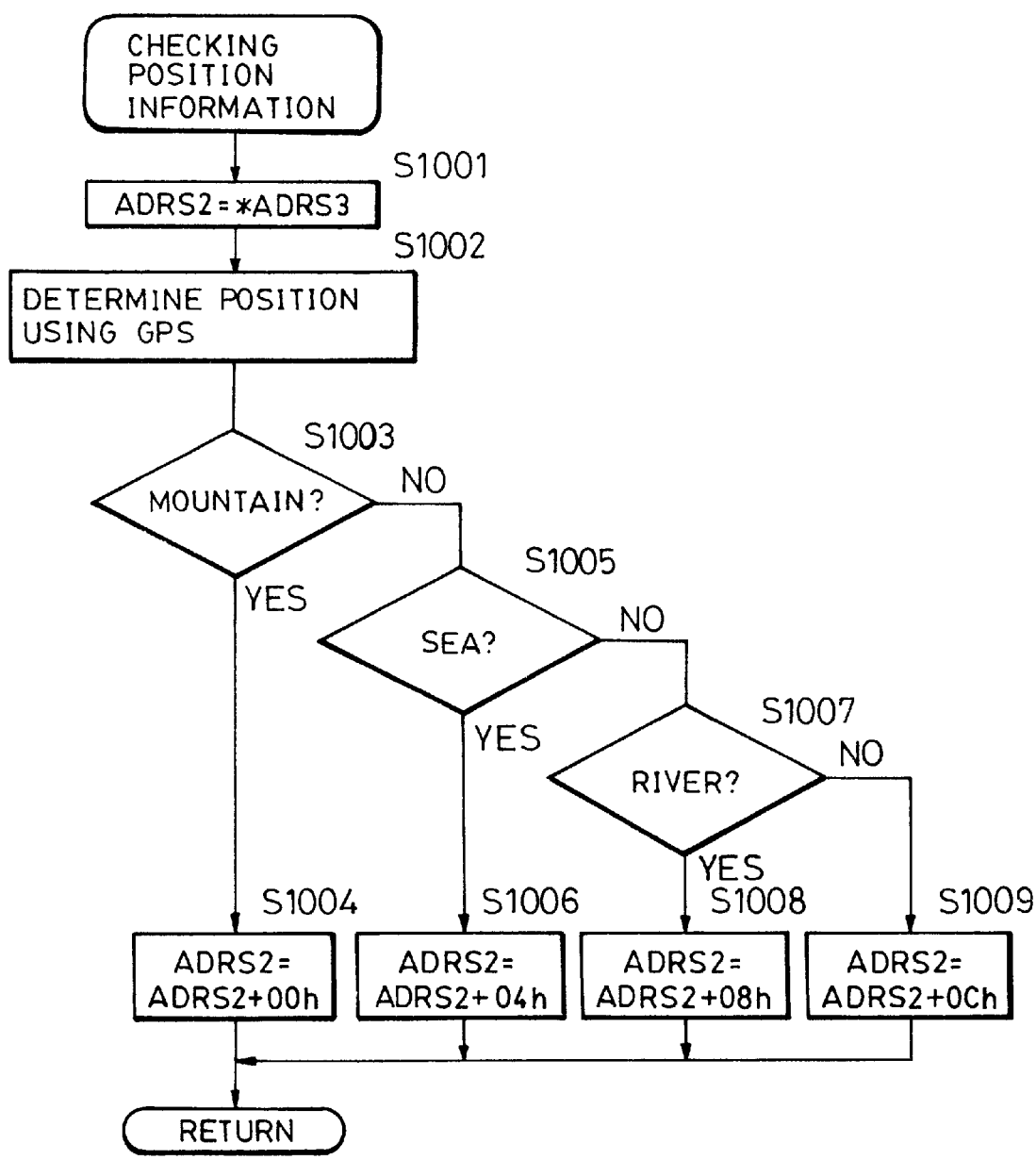
FIG. 16 is a flow diagram showing the operation of the checking of position information in the camera according to third embodiment of the present invention.

The microcomputer 16 goes to step S712 to check the position information. Referring to a flow diagram shown in FIG. 16, this process is discussed. The position information and the caption data in the third embodiment remain unchanged from those in the second embodiment.

In step S1001, the value of the address register ADRS3 is set to the address register ADRS2. In the next step S1002, the microcomputer 16 receives position fix data from the GPS receiver 17 and classifies it according to the geographical features such as mountains, seas, and rivers referencing to the place name data memory circuit 18 that stores place names, and converts the classified data into a predetermined code, in the same manner as in the second embodiment.

In step S1003, the microcomputer 16 determines whether the position information indicates the geographical feature "mountain". When it is determined that the position information indicates the geographical feature "mountain", the microcomputer 16 goes to step S1004 to add "00$h$" to ADRS2.

When it is determined in step S1003 that the position information does not indicate the geographical feature "mountain", the microcomputer 16 goes to step S1005 to determine whether the position information indicates the geographical feature "sea". When it is determined that the position information indicates the geographical feature "sea", the microcomputer 16 goes to step S1006 to add "04$h$" to the address register ADRS2.

When it is determined in step S1005 that the position information does not indicate the geographical feature "sea", the microcomputer 16 goes to step S1007 to determine whether the position information indicates the geographical feature "river". When it is determined that the position information indicates the geographical feature "river", the microcomputer 16 goes to step S1008 to add "08$h$" to the address register ADRS2.

When it is determined in step S1007 that the position information does not indicate the geographical feature "river", the microcomputer 16 goes to step S1009 to add "1Ch" to the address register ADRS2.

After the above process, the microcomputer 16 returns to step S705 shown in FIG. 13.

Returning to FIG. 13, the microcomputer 16 in step S710 determines whether the value of the address register ADRS3 is "01$h$". When it is determined that the value of the address register ADRS3 is not "01$h$", the microcomputer 16 goes to step S713 to determine whether the address register ADRS3 holds "02$h$". When it is determined that the address register ADRS3 holds "02$h$", the microcomputer 16 goes to step S714, where the value at address "03$h$" in the data memory circuit 3 is set to RAM1 and the difference between values at addresses "03$h$" and "02$h$" in the data memory circuit 3 is set to RAM2. In this embodiment, "40$h$" is set to RAM1 and "18$h$" is set to RAM2.

The microcomputer 16 goes to step S715 to check the date. The microcomputer 16 checks the date data (today) using the date circuit and compares it with a particular day. When the two days coincide with each other, the microcomputer 16 adds the code assigned to the date to the address register ADRS2. For example, "January 1" is coded as "00$h$", the Coming-Of-Age day is coded as "01$h$", and "December 31" is coded as "17$h$" in the order of dates throughout the year. If no corresponding date is found, the code of the particular date immediate before today is selected and is added to the address register ADRS2.

When it is determined in step S713 that the value of the address register ADRS3 is "03$h$" rather than "02$h$", no data table is selected and the microcomputer 16 ends the process without performing the subsequent steps.

Subsequent to any of the steps S704, S712 and S715, the microcomputer 16 goes to step S705 in any case. RAM1 then holds the sum of the ending address of the selected table and "01$h$" and RAM2 holds the number of data of the selected data table.

In step S705, the microcomputer 16 inputs the caption data from the data memory circuit 3 to the temporary data memory circuit 6. The data input to the temporary data memory circuit 6 will be described later. In step S706, the microcomputer 16 instructs the display circuit 5 to display on the LCD display the character string corresponding to the data stored in the address indicated by the address register ADRS1. In step S707, the address register ADRS1 is incremented to indicate an address that stores the next data.

In step S708, the microcomputer 16 determines whether the value of the address register ADRS1 is greater than the value stored in RAM2. When it is determined that the address register ADRS1 holds a value not greater than the value stored in RAM2, the microcomputer 16 returns to step S701. When it is determined that the address register ADRS1 holds a value greater than the value stored in RAM2, the microcomputer 16 goes to step S709 to set "00$h$" to the address register ADRS1 to clear it. That the value of the address register ADRS1 is greater than the value at RAM2, means that the value of the address register ADRS1 is also greater than the number of data stored in the temporary data memory circuit 6, and the data of the selected data table is fully rotated through by one cycle.

The above sequence is repeated each time the data selection switch 4 is pressed, and the caption data of the data table stored in the data memory circuit 3 is rotated through and selected.

Figure 14:
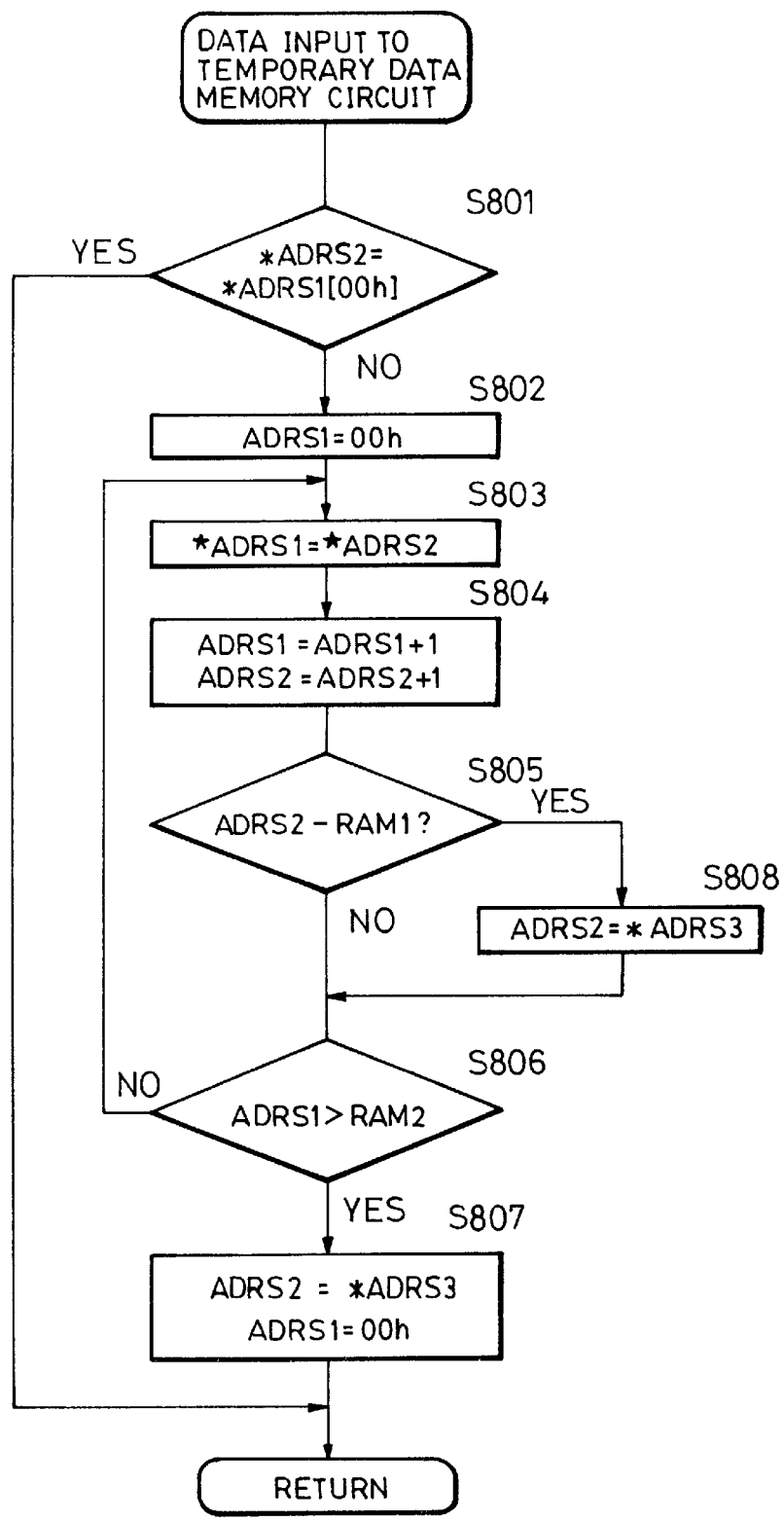
FIG. 14 is a flow diagram showing the rearrangement operation of the caption data in the camera according to the third embodiment of the present invention.

The sequence of data input to the temporary data memory circuit 6 from the data memory circuit 3 is now discussed, referring to a flow diagram shown in FIG. 14.

In step S801, the microcomputer 16 checks to see if the content at the address of the data memory circuit 3, indicated by the address register ADRS2, coincides with the content stored at the address "00$h$" in the temporary data memory circuit 6. When the two contents coincide with each other, the microcomputer 16 ends the process without performing any further step. The fact that the content at the address of the data memory circuit 3, indicated by the address register ADRS2, coincides with the content stored at the address "00$h$" in the temporary data memory circuit 6 means that there is no change between the currently selected data table and the data table selected when the data selection switch 4 was pressed for the last time.

When the two contents do not coincide, the microcomputer 16 goes to step S802 to clear the address register ADRS1 and set "00$h$" to the address register ADRS1. In step S803, the content in the data memory circuit 3, indicated by the address register ADRS2, is input to the address of the temporary data memory circuit 6, indicated by the address register ADRS1. In step S804, both address registers ADRS1 and ADRS2 are respectively incremented to indicate the next addresses (by adding "01$h$" thereto). In step S805, the microcomputer 16 checks whether the value of the address register ADRS2 is equal to the sum of the ending address of the table stored in RAM1 and "01$h$". When the value of the address register ADRS2 is equal to the sum, the microcomputer 16 goes to step S808 to set the value of the address register ADRS3 that holds the starting address of the selected table, to the address register ADRS2.

When it is determined in step S805 that the value of the address register ADRS2 is not equal to the sum of the ending address stored in RAM1 and "01$h$", or subsequent to step S808, the microcomputer 16 goes to step S806. The microcomputer 16 determines whether the value of the address register ADRS1 is greater than the number of data of the data table stored in RAM2. When it is determined that the value of the address register ADRS1 is not greater than the number of data of the data table stored in RAM2, the microcomputer 16 returns to step S803, and the process steps are repeated. When it is determined that the value of the address register ADRS1 is greater than the number of data of the data table stored in RAM2, the microcomputer 16 goes to step S807. The microcomputer 16 sets, to the address register ADRS2, the value of the address register ADRS3 at the starting address of the selected table while resetting the address register ADRS1 for "00h".

When the above repeated process ends, the caption codes corresponding to the data table selected starting with address "00h" is input to the temporary data memory circuit 6 in the order of the photograph mode, the position information and date. Specifically, when the photograph mode table is selected, the caption code corresponding to the current photograph mode is input to the temporary data memory circuit 6 from its upper address down. When the place name table is selected, the caption data corresponding to the geographic area is input to the temporary data memory circuit 6 from its upper address down. When the date table is selected, the caption code corresponding to the present date is input to the temporary data memory circuit 6 from its upper address down. The selected data is then displayed on the LCD display.

The third embodiment has a plurality of data tables for captions. The data table selection switch 19 selects the data table, and the selection order of the captions is modified in accordance with the selected data table. When the photograph mode is selected, the order of the arrangement of the caption codes corresponding to the photograph mode stored in the data memory circuit 3 is modified according to the photograph mode when the caption mode is selected.

When the place name table is selected, the order of the arrangement of the caption codes corresponding to the place names stored in the data memory circuit 3 is modified according to the position information when the caption data is selected.

When the date table is selected, the order of the arrangement of the caption codes corresponding to the particular dates stored in the data memory circuit 3 is modified according to the date when the caption data is selected.

The captions closely related to the selected table are arranged first in the arrangement order so that a caption, likely to be selected by the user, may be selected quickly. The camera thus reduces the time required to set the caption data and helps the photographer avoid missing a photo opportunity.

The third embodiment presents three types of data tables of the photograph mode, place name and date. The present invention is not limited to these three types. Another information table in connection with photographing may be set.

The selection order of the captions is modified within the selected data table independently of the other data tables. The arrangement order may be modified considering the information of the photograph mode, place name and date. For example, when the place name table is selected, not only the position information but also the present date may be considered in the modification of the arrangement order.

The number of data in each table is not limited to the one described above, and may be modified as required.

In the third embodiment, such a modification may be carried out by changing, in accordance with the required number of data, the values at "00h" through "04h" in the data memory circuit storing the starting address of each table.

The place name data memory circuit 18 may be replaced with the data memory circuit 3. The data memory circuit 3 may store place names in a hierarchical fashion so that the geographical data may be quickly hierarchically rearranged in response to the position information of the GPS receiver 17. A place name is thus quickly selected so that the geographical code or the place name stored in the data memory circuit 3 may directly be recorded onto the film.

The geographical area is determined referring to the position information from the GPS receiver 17. A device may be provided for the photographer to designate a position and the selection order of the captions may be modified according to the designated position.

The method of modifying the order of the arrangement of the caption data is not limited to the one shown in the above embodiments. Any method is acceptable as long as it modifies the order of the arrangement according to the information about photographing.

In the first and third embodiments, the arrangement order within each group in each mode remains unchanged and input to the temporary data memory circuit 6. Alternatively, means may be incorporated to change the order within each group.

The advantages of each of the above embodiments are summarized below.

According to the first embodiment, the selection order of the captions is modified according to the photographic information so that the captions closely related to the photographic information are arranged first. A caption that is likely to be selected by the user is selected quickly. The camera thus reduces the time required to set the caption data and helps the photographer avoid missing a photo opportunity.

According to the second embodiment, the selection order of the captions is modified according to the position information so that the captions closely related to the position information are arranged first. A caption that is likely to be selected by the user is selected quickly. The camera thus reduces the time required to set the caption data and helps the photographer avoid missing a photo opportunity.

According to the third embodiment, a plurality of caption data tables are prepared, the selection order of the captions is modified according to the selected data table, and the captions closely related to the selected data table are arranged first. A caption that is likely to be selected by the user is selected quickly. The camera thus reduces the time required to set the caption data and helps the photographer avoid missing a photo opportunity.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The present invention may equally work well in an image recording medium other than the film.

The present invention may be applied to record information onto the film in even a way other than electrically, magnetically and optically.

In the software and hardware structures in the above embodiments, one component may be substituted for another as necessarily.

Embodiments and elements of each embodiment in the present invention may be combined as necessary.

The construction of each claim or embodiment of the present, in whole or in part, may form an apparatus or part of an apparatus or may be combined with another apparatus.

The present invention may be applied to a diversity of cameras including single-lens reflex cameras, lens-shutter cameras, and video cameras, optical devices other than the cameras, other devices, devices that are incorporated in a camera, an optical device or other device, and units that constitute these devices.

What is claimed is:

1. A camera comprising:
    (A) a selection unit for selecting data,
    (B) a recording unit for recording the data selected by said selection unit onto an image recording medium,
    (C) a mode selection unit for selecting a mode, and
    (D) a changing unit for changing, in accordance with the selected mode, a selection manner and selection order by which said selection unit selects the data, such that the data corresponding to the selected mode is arranged first in the selection order.

2. A camera according to claim 1, wherein said selection unit sequentially selects data from among a plurality of data.

3. A camera according to claim 1, wherein said information relating to the image being photographed concerns photographing conditions.

4. A camera according to claim 1, wherein said information relating to the image being photographed concerns a photograph mode.

5. A camera according to claim 1, wherein said information relating to the image being photographed concerns a date and time.

6. A camera according to claim 1, further comprising a memory unit for storing a plurality of data that are to be selected by said selection unit.

7. A camera according to claim 1, wherein said recording unit records the data onto the image recording medium so as to correspond to an image being photographed.

8. A camera according to claim 1, wherein said recording unit magnetically records the data onto a film of the image recording medium.

9. A camera according to claim 1, wherein said recording unit imprints the data onto a film of the image recording medium.

10. A camera comprising:
    (A) a selection unit for selecting data,
    (B) a recording unit for recording the data selected by said selection unit onto an image recording medium,
    (C) a position determining unit for determining position information, and
    (D) a changing unit for changing, in accordance with the position information, a selection manner and selection order by which said selection unit rearranges the data, such that the data corresponding to the position information is arranged first in the selection order.

11. A camera according to claim 10, wherein said selection unit sequentially selects data from among a plurality of data.

12. A camera according to claim 10, further comprising a detector for detecting the position information.

13. A camera according to claim 10, further comprising a detector that detects the position information receiving a position-fixing radio wave.

14. A camera according to claim 10, further comprising a memory unit for storing a plurality of data that are to be selected by said selection unit.

15. A camera according to claim 14, wherein said memory unit stores place name data as the plurality of data.

16. A camera according to claim 10, wherein said recording unit records the data onto the image recording medium so as to correspond to an image being photographed.

17. A camera according to claim 10, wherein said recording unit magnetically records the data onto a film of the image recording medium.

18. A camera according to claim 10, wherein said recording unit imprints the data onto a film of the image recording medium.

19. A camera comprising:
    (A) a first selection unit for selecting at least one data group from among a plurality of different data groups,
    (B) a second selection unit for selecting data from the data group selected by said first selection unit,
    (C) a recording unit for recording the data, selected by said second selection unit, onto an image recording medium,
    (D) a mode selection unit for selecting a mode, and
    (E) a changing unit for changing, in accordance with the selected mode, a selection manner and selection order by which said second selection unit selects the data, such that data corresponding to the selected mode is arranged first in the selection order.

20. A camera according to claim 19, wherein said second selection unit sequentially selects data from among a plurality of data in the data group that is selected by said first selection unit.

21. A camera according to claim 19, wherein said information relating to the image being photographed concerns photographing conditions.

22. A camera according to claim 19, wherein said information relating to the image being photographed concerns a photograph mode.

23. A camera according to claim 19, wherein said information relating to the image being photographed concerns a date and time.

24. A camera according to claim 19, wherein said information relating to the image being photographed is position information.

25. A camera according to claim 19, further comprising a memory unit for storing a plurality of different data groups.

26. A camera according to claim 19, wherein said recording unit records data onto the image recording medium so as to correspond to an image being photographed.

27. A camera according to claim 19, wherein said recording unit magnetically records data onto a film of the image recording medium.

28. A camera according to claim 19, wherein said recording unit imprints the data onto a film of the image recording medium.

29. An apparatus comprising:
    (A) a selection unit for selecting data,
    (B) a recording unit for recording the data selected by said selection unit onto an image recording medium,
    (C) a mode selection unit for selecting a mode, and
    (D) a changing unit for changing, in accordance with the selected mode, a selection manner and selection order by which said selection unit selects the data, such that the data corresponding to the selected mode is arranged first in the selection order.

30. An apparatus for a camera, comprising:

(A) a selection unit for selecting data, (B) a position determining unit for determining position information, and (C) a changing unit for changing, in accordance with the position information, a selection manner and selection order by which said selection unit rearranges the data, such that the data corresponding to the position information is arranged first in the selection order.

31. An apparatus comprising:

(A) a first selection unit for selecting at least one data group from among a plurality of different data groups, (B) a second selection unit for selecting data from the data group selected by said first selection unit, (C) a recording unit for recording the data selected by said selection unit onto an image recording medium, (D) a mode selection unit for selecting a mode, and (E) a changing unit for changing, in accordance with the selected mode, a selection manner and selection order by which said selection unit selects the data, such that the data corresponding to the selected mode is arranged first in the selection order.

* * * * *